US007454706B1

(12) United States Patent
Matthews et al.

(10) Patent No.: US 7,454,706 B1
(45) Date of Patent: Nov. 18, 2008

(54) MULTIPLE-PAGE SHELL USER INTERFACE

(75) Inventors: Joseph H. Matthews, Woodinville, WA (US); Joseph D. Belfiore, Seattle, WA (US); Stephen P. Capps, Seattle, WA (US); Hillel N. Cooperman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/503,137

(22) Filed: Feb. 11, 2000

(51) Int. Cl.
*G06F 3/00* (2006.01)
(52) U.S. Cl. .................. 715/713; 715/712; 715/738; 715/804
(58) Field of Classification Search ............ 345/712, 345/713, 738, 745, 804, 760, 796, 853–855, 345/779, 744, 847; 707/513; 715/712–713, 715/738, 745, 804, 760, 796, 835, 854, 855, 715/779, 744, 847
See application file for complete search history.

(56) References Cited

U.S. PATENT DOCUMENTS

| | | | | |
|---|---|---|---|---|
| 5,513,342 A * | 4/1996 | Leong et al. | ................. | 715/798 |
| 5,740,549 A * | 4/1998 | Reilly et al. | ................. | 705/14 |
| 5,745,112 A * | 4/1998 | Hirose | ................. | 345/769 |
| 5,838,319 A * | 11/1998 | Guzak et al. | ................. | 715/854 |
| 5,877,765 A * | 3/1999 | Dickman et al. | ............. | 345/738 |
| 5,905,492 A * | 5/1999 | Straub et al. | ................. | 345/744 |
| 6,061,695 A * | 5/2000 | Slivka et al. | ................. | 707/513 |
| 6,163,799 A * | 12/2000 | Kambayashi et al. | ........ | 709/204 |
| 6,216,141 B1 * | 4/2001 | Straub et al. | ................. | 707/513 |
| 6,222,638 B1 * | 4/2001 | Otala | ................. | 358/1.18 |
| 6,278,448 B1 * | 8/2001 | Brown et al. | ................. | 345/866 |
| 6,571,245 B2 * | 5/2003 | Huang et al. | ................. | 707/10 |
| 6,826,696 B1 * | 11/2004 | Chawla et al. | ............. | 713/201 |
| 7,174,517 B2 * | 2/2007 | Barnett et al. | ................ | 715/764 |
| 2002/0059288 A1 * | 5/2002 | Yagi et al. | ................. | 707/102 |

* cited by examiner

*Primary Examiner*—Simon Ke
(74) *Attorney, Agent, or Firm*—Workman Nydegger

(57) ABSTRACT

A shell navigation tool for a personal computer having a multiple page shell user interface and a shell component. The shell user interface utilizes navigation between multiple layers of pages to organize and display links to local and remote documents, programs, web links, tasks, services, devices, and the like. At the top level of the multiple-page shell user interface, a start page provides access via hyperlinks to lower order pages, as well as links to system settings, and a limited number of local and remote documents, web links, and programs. Lower pages in the hierarchy, referred to as "Activity Centers" may be scoped to define activity types or groups (e.g., games, web, photography, personal finance). An Activity Center page provides links to local and remote programs documents, and web links, that are related to the defined activity.

39 Claims, 15 Drawing Sheets

| ITEM | DESCRIPTION |
|---|---|
| Freindly Name | string |
| URL | (navigation for Friendly file link) |
| Rich Icon | <location> |
| Program Icon Set | <location> |
| Rich View Template | <location> |
| Item 1 | item description or location |
| Item 2 | item description or location |
| Item 3 | item description or location |

210

MULTIPLE-PAGE SHELL USER INTERFACE

FIELD OF THE INVENTION

The present invention generally relates to computer systems, and more particularly to graphical user interfaces for a computer operating system.

BACKGROUND OF THE INVENTION

A contemporary operating system, such as Microsoft Corporation's Windows® 98 operating system, provides many different ways in its shell user interface to navigate among local and remote (e.g., Internet) content, components, and resources. For example, the user's desktop provides storage for or links to programs, documents, and system resources. A Start button provides navigation to recent documents, system resources, a Favorites list (through which a user may access saved web locations), computer Settings, Programs, Search, Find, and so forth.

The menu items in the start menu and the icons and/or files on the desktop normally represent software resources (e.g., files) available to the computer. During installation of application programs, the application programs may put items on the Start menu, and one or more shortcuts on the desktop. After installing several application programs, both the start menu and desktop often have so many menu items and icons that it prevents the user from efficiently executing common operations.

Further, Microsoft Corporation's Windows Explorer offers a view of files on a computer. However, to a beginning or intermediate user, the number of files shown may be overwhelming, and the location of particular files may not be logical, making finding a particular file difficult.

Another example of information that is sometimes hard to find on a computer is saved web locations. A link to a web location (hereinafter "web links") may be saved in a number of places in the computer, such as in a "Favorites" list or on the desktop, for example. Another user interface that provides access to web content is a web portal. A portal (e.g., www.msn.com) is a website that aims to be a "doorway" to the World-Wide Web, typically offering a search engine and/or links to useful web pages, and possibly news or other services. These services are usually provided for free in the hope that users will make the site their default home page, or at least visit it often, whereby the service may profit by selling advertising.

Although each of these user interfaces provides a method for accessing local and/or remote content, beginning and intermediate computer users are often confused about where to go to find programs and documents on a computer. Even if a user locates a program, the user may not known whether to look locally or remotely for particular content. Thus, current organization and presentation to local and remote programs, documents, system resources and content on a computer is confusing to many users.

SUMMARY OF THE INVENTION

The present invention relates generally to a shell user interface for providing an aggregation of local and web information on a personal computer. To this end, the user interface is organized in a web of multiple pages, arranged in a hierarchy, so as to provide logical combinations of links to files, devices, and resources that are accessible by the computer, whether the items are local or remote. For example, web links may be grouped with links to programs, documents, system information, devices, services and so forth. By logically combining the links on a single page regardless of source location (local or remote), the user is not required to known the actual location or source of the file, device, content, service, or the like to access it.

At the top level of the multiple-page shell user interface, a start page provides access via hyperlinks to lower order pages, as well as links to system settings, and a limited number of local and remote documents, web links, and programs. The start page is designed to be presented to a user at the beginning of the user's session on the computer, and provides a broad view of what is accessible via the computer, without reference to whether an item is local or remote. The user may return to the start page at any point in the session to access additional information and/or links. The organization and content of the start page may be edited by the user.

Lower pages in the hierarchy, called "Activity Centers," may be scoped to define activity types or groupings (e.g., games, web, photography, personal finance). The Activity Center page provides links to local and remote programs, documents, web links and/or devices, that are related to the defined activity. For example, a photography activity center might provide links to stored photographs, photo editors, a camera attached to the computer, and photography websites.

A number of links to programs, documents, and web links are provided at the start page and the Activity Center pages. The links that are shown may be determined according to a query. For example, the five most recently used (MRU) documents and web links may be shown on the start page, along with the five most frequently used (MFU) programs. Alternatively, web links maybe shown in accordance with information provided by a remote source, such as an Internet Access Provider or a portal website. Other links to documents, web links, and programs may be accessed by clicking on links that open lower order pages, such as pages that display documents (Documents page), web links (Web Links page), or programs (Programs page).

Task-oriented links are also provided at the start page and/or the Activity Center pages. The tasks provide a link to the actual processes performed by programs. For example, clicking on an "Edit Photo" button might provide access to an "Edit Picture" dialog box within a local program, or alternatively, to a link to a program at a picture editing website. Tasks may also be provided at Programs, Web Links, and Documents pages. The tasks at these pages define actions that may be taken with respect to the programs, web links, or documents shown on the page. For example, a "Remove Program" link may be provided on the Programs page. Clicking on any task may start operation of the task, or may open a separate page in which the task is performed.

Programs and websites are registered with the start page and/or one or more Activity Centers. To do this, upon loading the multiple-page shell user interface, a registration mechanical scans programs and saved web links and compares them against a catalog of programs and web links. Matching programs and websites are then registered within a unified database. Information about the programs, such as categories (i.e., Activity Centers) and capabilities (i.e., Tasks), is written into the database. Similarly, particular document types are registered with particular pages. For example, documents stored within a "My Documents" folder are registered with the start page, and documents within a "My Pictures" folder are registered with the Photography Activity Center. The unified database may be queried, whereby the start page and the Activity Centers may access and query it to determine the proper links to display on the pages.

To register a program that is being added to a personal computer that already has the multiple-page user interface installed, the program preferably includes metadata in the form of a schema that defines the categories and capabilities of the program. The program displays a user interface to the user asking if the user wants the program registered, and if so, then an ActiveX® control makes a call to register the program (e.g., via an API) with the unified database.

Websites include similar metadata. The metedata is added to the unified database by the user clicking on a command, such as "Bookmark this page". Adding the metadata to the unified database registers the website with the appropriate Activity Centers and/or the start page.

A document created from within an Activity Center page and/or its hierarchy of lower order pages is preferably linked to that page so that the user may access the document via an associated link on that page. To do this, information about the document is written into a database, and the information is associated with the Activity Center. Additionally, documents of a particular file type may be registered with a particular Activity Center page.

A search engine is provided that parses information in the unified database. Because the unified database includes web links, documents, and programs, a preferred search engine is capable of searching both local and remote information. After searching the unified database, the search engine may provide a broader-scoped search (e.g., a search of the World Wide Web), if necessary.

A user may create and/or edit the content of the Activity Centers. To this end, a wizard may be provided to determine the behavior and preferences of a user, so as to provide default Activity Centers and hide others. A "Favorites" list may also be utilized that provides targets to both local and remote links. The favorites are preferably pervasive throughout the computer user's experience, and a user may select an item to go within a Favorites folder at any location, such as a particular website, a document, a dialog box within an application, or a program link. The favorite may be placed within the start page folder or within a particular Activity Center folder.

Other advantages will become apparent from the following detailed description when taken in conjunction with the drawings, in which:

DETAILED DESCRIPTION

Exemplary Operating Environment

Figure 1:
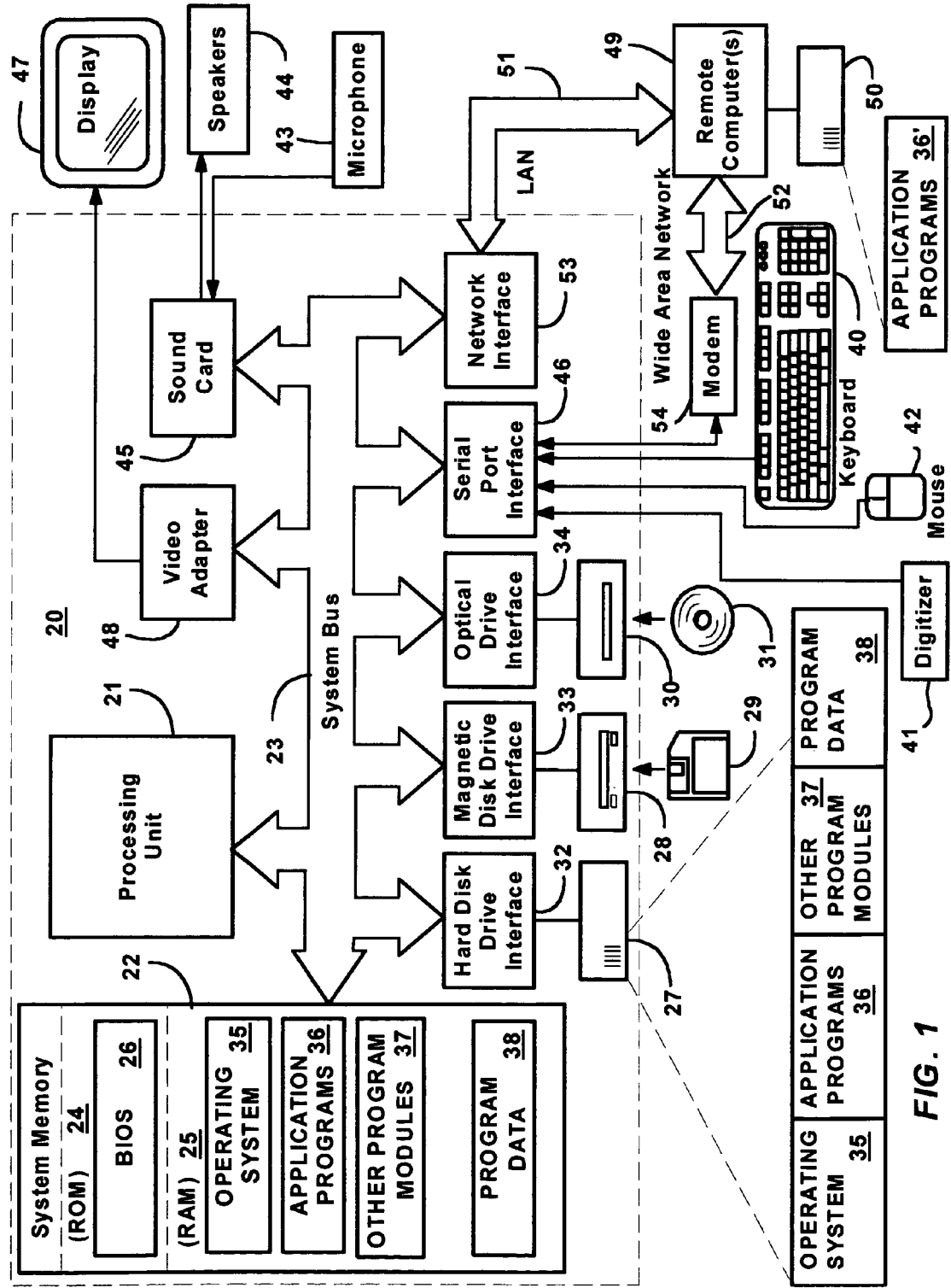
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computing 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24 The personal computer 20 may further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which may store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LNA networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Multiple-Page Shell User Interface

Figure 2:
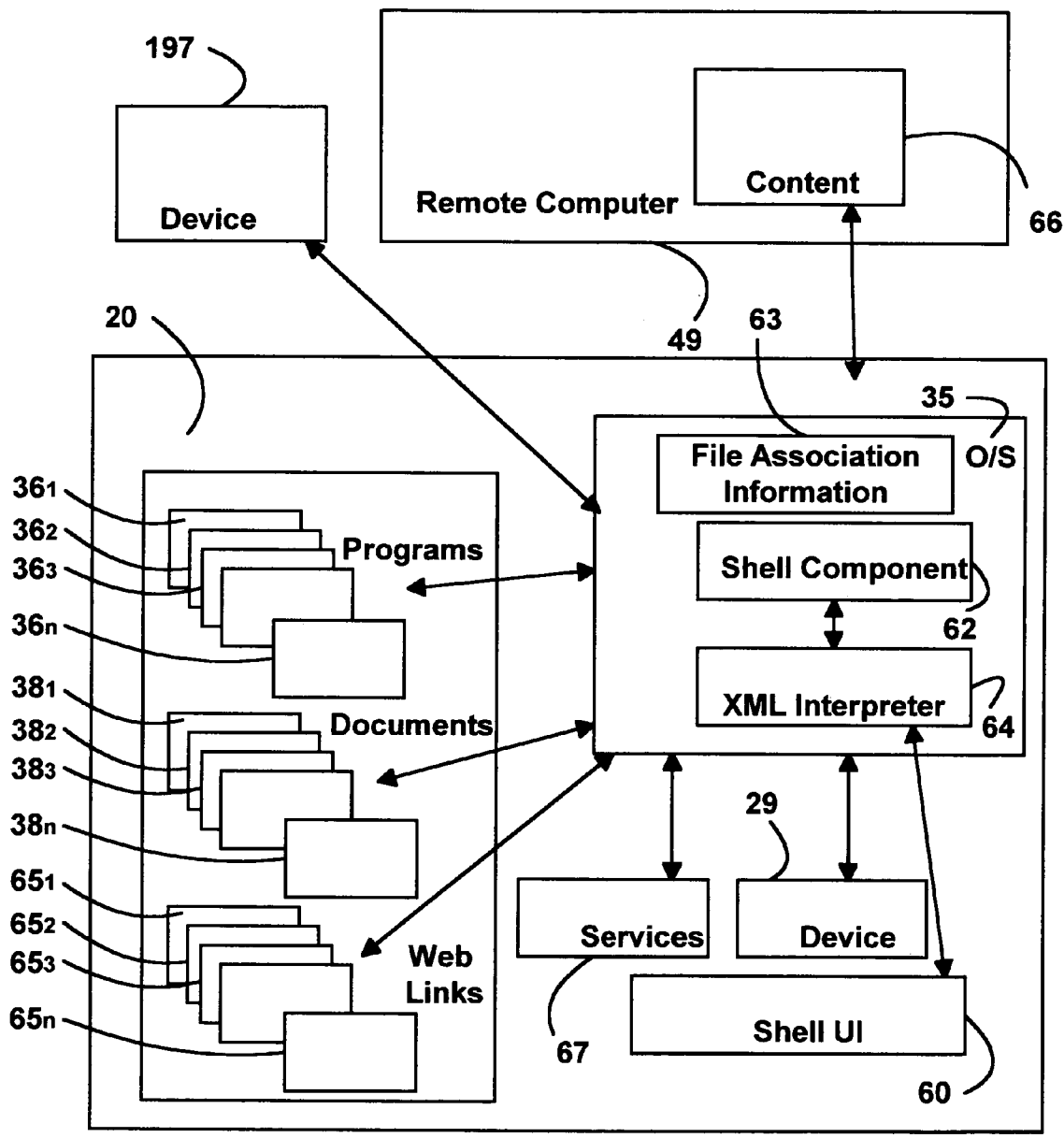
FIG. 2 is a block diagram representing a general architecture for a shell navigation tool in accordance with the present invention.

The present invention provides a shell navigation tool for a computer system (e.g., the computer system 20) having a shell user interface 60 and a shell component 62 (FIG. 2). In summary, the shell user interface 60 facilitates navigation between multiple layers (e.g., a hierarchically organized web) of pages to organize and display links to local and remote documents, programs, web links, tasts, services, devices, and the link. The shell component 62 registers the documents, programs, web links, tasks, services, and devices with particular pages in a hierarchy of pages so as to logically present links to the items.

As used herein, a "link" is a pointer to a respective file, document, program, web link, task, service, device, or the like. A "hyperlink" is a link embedded in a page. Selection of a link (e.g., by clicking on a hyperlink in a page) accesses the item associated with the link. For example, clicking on a program hyperlink launches the respective program (or may bring forward a running instance of a program), while clicking on a document hyperlink opens the document (e.g., document, picture, wav file) in the appropriate program (after first launching the program, if necessary). Likewise, clicking on a hyperlink to a web link retrieves the related content (e.g,. from cache or via a remote connection) and loads the content into a running program or executable code (e.g., a browser control).

In any event, as can be seen in FIG. 2, the shell component 62 is maintained within (or alternatively is associated with) the operating system 35. The operating system includes a renderer, such as XML or HTML interpreter 64, having network access software. In addition, file association information is maintained in a database 63 accessible by the operating system (e.g., in a registry). File storage (e.g., one or more hard disk drives 27 (FIG. 1)) is provided for storing multiple programs or executable code $36_1$-$36_n$, multiple files of program data (i.e., documents) $38_1$-$38_n$, and multiple links $65_1$-$65_n$, to remote content (e.g., web based URLs). As used herein, the term "programs" is used broadly herein to mean any application program, program module, or executable code. The shell component 62 accesses the programs $36_1$-$36_n$ and/or documents $38_1$-$38_n$ in response to selection by a user of (e.g., clicking) the respective hyperlink. The shell component 62 may also access remote content 66 (e.g., files, web pages, and/or programs located on remote computer 49) in response to a selection of one of the web links $65_1$-$65_n$ sent via the shell interface.

The Start Page and Activity Centers

At the top level of the multiple-page shell user interface 60, a start page 70 (FIG. 3) provides access via hyperlinks to lower order pages, as well as links to a limited number of local and remote documents $38_1$-$38_n$, web links $65_1$-$65_n$, and programs $36_1$-$36_n$. The hyperlinks are displayed as headings, titles, icons, or the like, the selection of which provides access (via the shell component 62) to either a lower order page or local and/or remote programs, documents, websites, services, or devices.

The start page 70 and the lower order pages described herein are preferably HTML (Hypertext Markup Language) pages. HTML-created pages permit easy embedding of hyperlinks to web-based URLs or local references, and editing by a designer or a user. Note, however, there is no intention to limit the present invention to HTML, as virtually any page format language, e.g., XML (Extensible Markup Language) or DHTML (Dynamic HTML) or other page creation mechanism will suffice. Hyperlinks to pages, programs, documents, web links, services, devices, and the like are embedded in the pages of the shell user interface 60.

One possible default setting for the start page 70 and the lower order pages is maximization to the entire screen, so that the user is presented with an easy-to-read display. However, the start page 70 and the other pages may be sized by a user or a designer so as to operate in a multiple-window environment.

In a preferred embodiment, the start page 70 is initially designed so that its lists are viewable without scrolling. If further information is desired on the start page 70 (e.g., if the user customers the start page such that the displayed information exceeds the displayable area), scrolling may be utilized.

A renderer (e.g., the interpreter 64) provides the mechanism to display the start page 70 and lower order pages. If a format other than HTML, XML, or DHTML is used, then an appropriate mechanism for rendering that page format may be provided on the personal computer 20.

Figure 4:
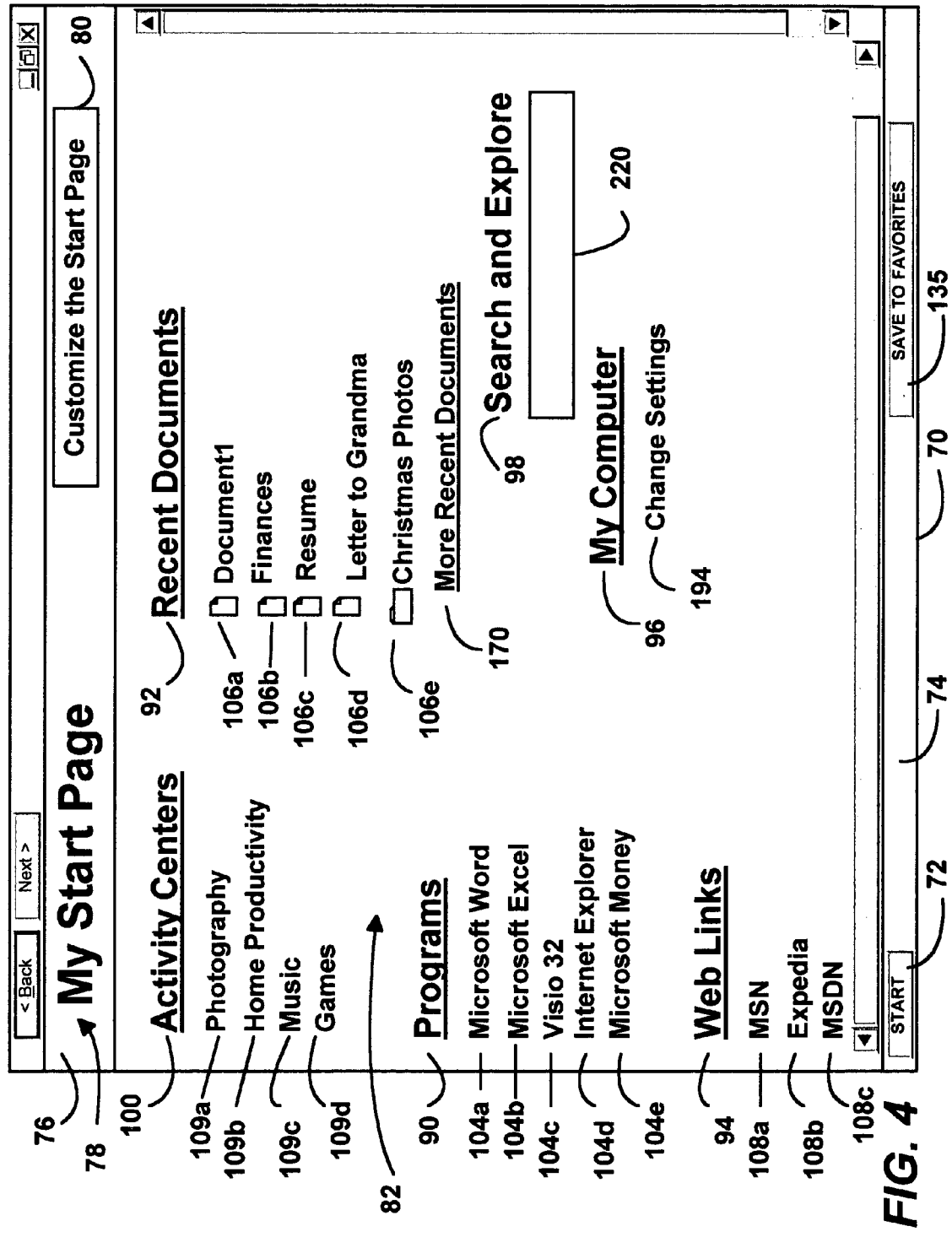
FIG. 4 is a representation of a screen shot of a start page for the shell user interface of FIG. 2.

An embodiment of the start page 70 in accordance with the present invention is shown in FIG. 4. Upon start-up of the personal computer 20, a blank desktop (not shown) may be presented, along with a start button 72 on a taskbar 74. Clicking the start button 72 brings the start page 70 up and to the front of the computer display. Alternatively, the start page 70 may be arranged (e.g., registered in the registry of the operating system 35) so that it is automatically display upon start-up of the computer 20.

In one embodiment, the start page 70 includes a header/banner 76 having an editable title 78 (in the example shown, "My Start Page"). The header 76 may further identify the owner of the start page 70 and the current user session. The header 76 shown in FIG. 4 stretches across the full width of the start page 70, but may be sized or positioned as desired by a designer and/or a user. Other text, photographs and/or images may be added to customize the header 76 for a particular user.

The start page 70 includes a links region 82 having multiple lists with headings. The start page 70 shown in FIG. 4 includes a Programs heading 90, a Recent Documents header 92, a Web Links heading 94, a My Computer heading 96, a Search and Explore heading 98, and an Activity Centers heading 100.

The header 76 includes a "Customize the Start Page" button 80. Clicking the "Customize the Start Page" button 80 links the user to a customization page 81 (FIG. 3), which allows the user to change the layout of the start page 70. For example, the user may choose to hide or show any heading (and/or the associated list), change the ordering of the lists, list view state and/or change the overall layout. A user may also remove any of these headings or may add further headings as desired via the "Customize the Start Page" button 80 and the related customization page 81.

Figures 8, 9:
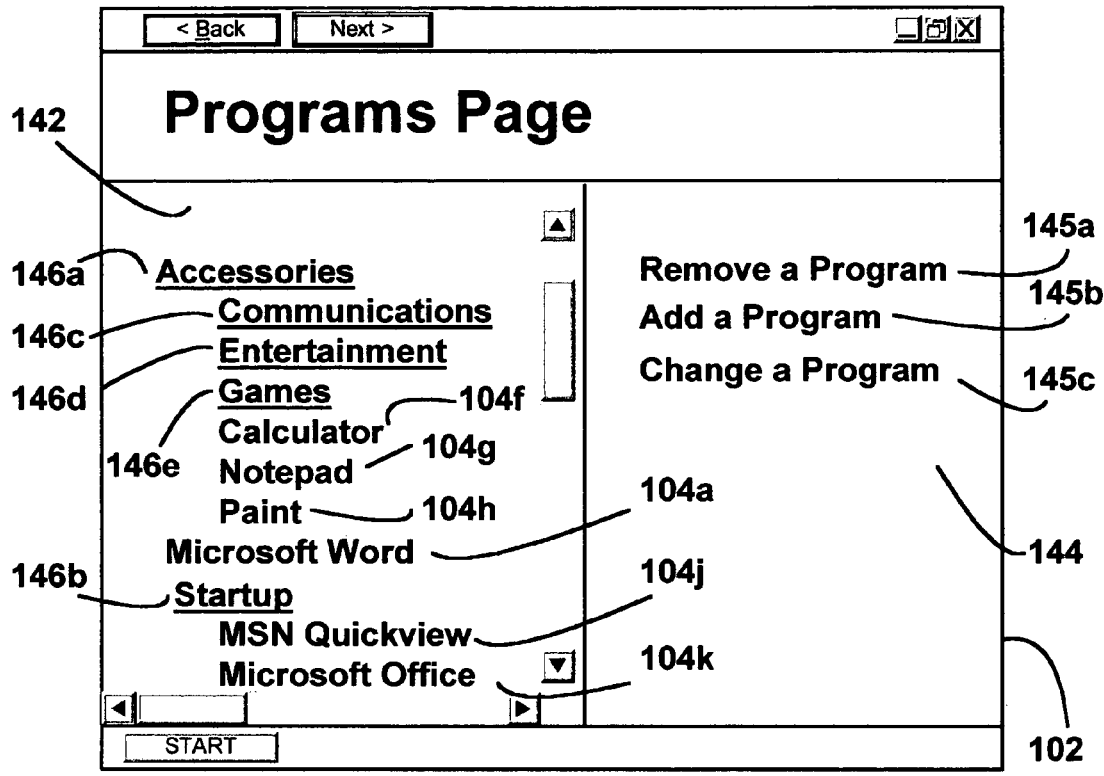
FIG. 8 is a representation of a screen shot of a programs page for the shell user interface of FIG. 2
FIG. 9 is a representation of default file associated of Activity Centers and the start page.

As is described further below, the headings 90-100 contain a hyperlink to a lower order page related to that heading. Therefore, selecting (e.g., clicking on) one of the headings 90-100 navigates a user to a page for that heading. For example, clicking on the Programs heading 90 links the user to a Programs page 142 (FIG. 8). To return to the start page 70 from a lower order page in the hierarchy, a user clicks the Start Button 72 on the task bar 74.

Five hyperlinks 104a-104e to programs 36 that are registered with the start page 70 are listed (i.e., displayed) under the Programs heading 90. The hyperlinks are displayed as titles of the respective programs 36, but may be icons or other symbols to represent the programs (or both titles and icons). Likewise, hyperlinks 106a-106e to documents 38 and hyperlinks 108a-108c to web links 65 are listed under the Recent Documents heading 92 and the Web Links heading 94, respectively. Clicking on a program hyperlink 104a-104e launches the program 36, while clicking on a document hyperlink 106a-106e launches the document (e.g., document, picture, wav file) in the appropriate program (after first launching the program, if necessary).

Likewise, clicking on ah hyperlink 108a-108c to a web link retrieves the related remote content and loads the content into a running program or executable code (e.g., the interpreter 64). If a connection is available to the location of the content, the content may be provided from the location. Alternatively, the content may be synchronized with cached content from the location (if available), and then provided from cache if the content has not changed since caching. If a connection to the remote location is into available, cached content from the location may be provided, if available. If not available, the interpreter 64 may handle appropriately (e.g., by providing a message to a user indicating that the content is not available, or by making a connection to the location).

In accordance with another aspect of the present invention, a list of hyperlinks 109a-109d to a number of different Activity Center pages 110a-110d is displayed under the Activities Center heading 100. Selecting a hyperlink 109a-109d opens the associated page 110a-110d. As will be discussed further below, each of the Activity Center pages 110a-110d includes links to lower pages and/or programs, documents, and web links. Preferably, all of the links on one Activity Center page are directed to a particular activity type. The Activity Center pages 110a-110d shown herein represent photography, home and family, music, and game Activity Center pages, respectively, but an Activity Center may be directed to any field or category. A designer or the vendor may provide a personal computer 20 with one or more Activity Centers, and may tailor those Activity Centers so as to attract particular customers. In addition, if desired, a designer may provide a wizard (not shown) that, upon first operation of the computer, offers a question and answer session. Activity Centers are provided or hidden from the user as a result of the answer to the questions. Further, if desired, a wizard or dialog may be provided that permits a user to create his or her own Activity Center.

Figure 5:
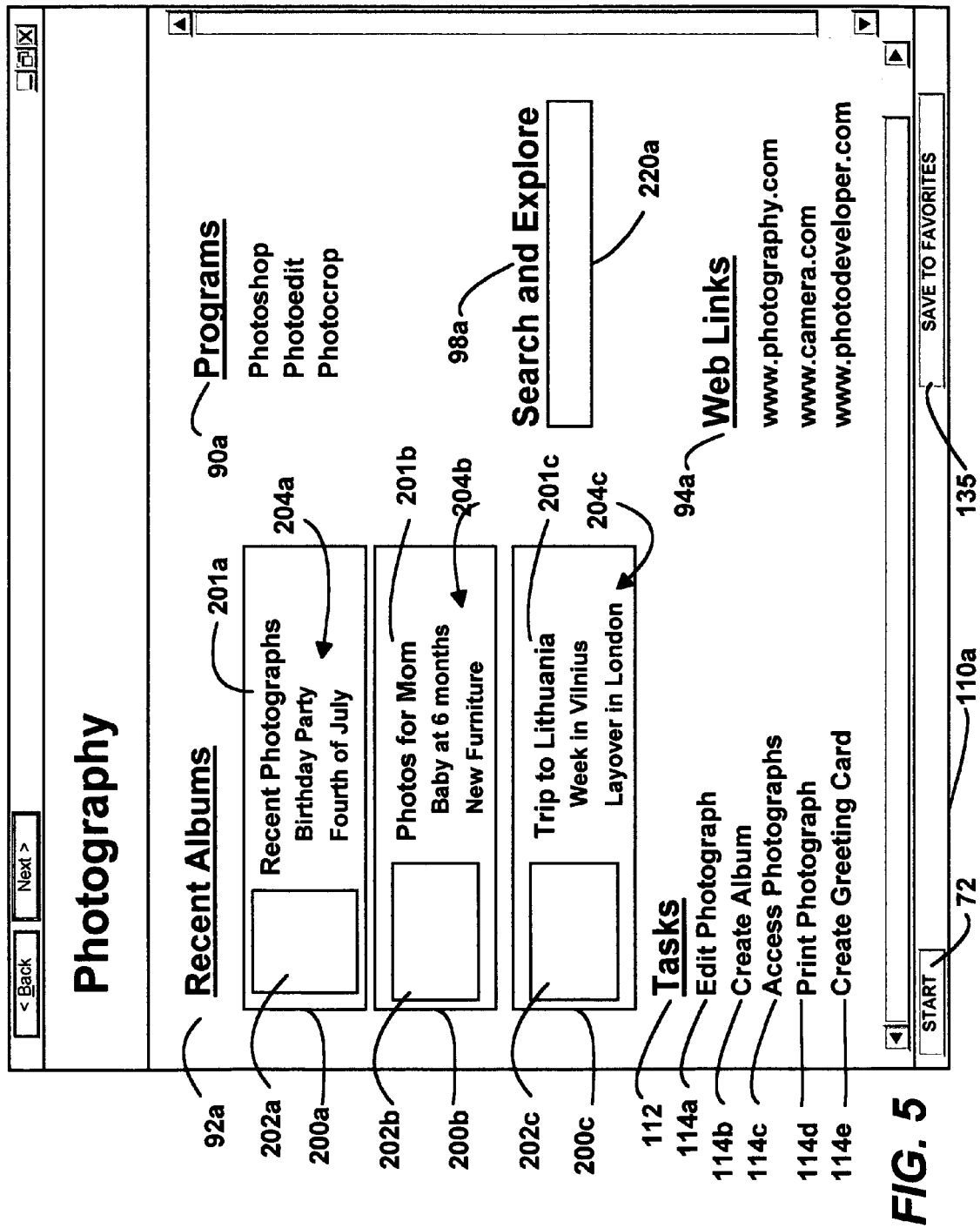
FIG. 5 is a representation of a screen shot of an Activity Center page for the shell user interface of FIG. 2.

The Photography Activity Center page 110a is shown in FIG. 5. As can be seen, the Photography Activity Center page 110a includes some equivalent headings as the start page 70, including a Programs heading 90a, a Recent Documents heading 92a (called "Recent Albums" on the Photography Activity Center page 110a), a Web Links heading 94a, and a Search and Explore heading 98a. In addition, each Activities Center page may include a Task heading 112, under which are listed hyperlinks 114a-114e to a number of capabilities, or tasks. As is described further below, a task is a process that a program may perform. Selecting a task link either initiates the program's process, or opens a task page that is directed to the process. For example, clicking on a link entitled "Create a Greeting Card" opens a separate task page in a greeting card creation program. Links to tasks may be provided in an Activity Center page or in the start page 70.

Registration of Programs and Web Links

When the multiple-page shell user interface 60 is installed on a personal computer, the shell component 62 attempts to register existing programs 36, tasks, and web links 65 with the start page 70. For Activity Centers, the Programs 36, web links 65 and Tasks that are directed to or related to the activity of that Activity Center are registered with the linked Programs page. For example, the Programs 36 and Tasks that are directed to Photography are registered with a Programs page linked to the Photography Activity Center page 110a.

Figure 6:
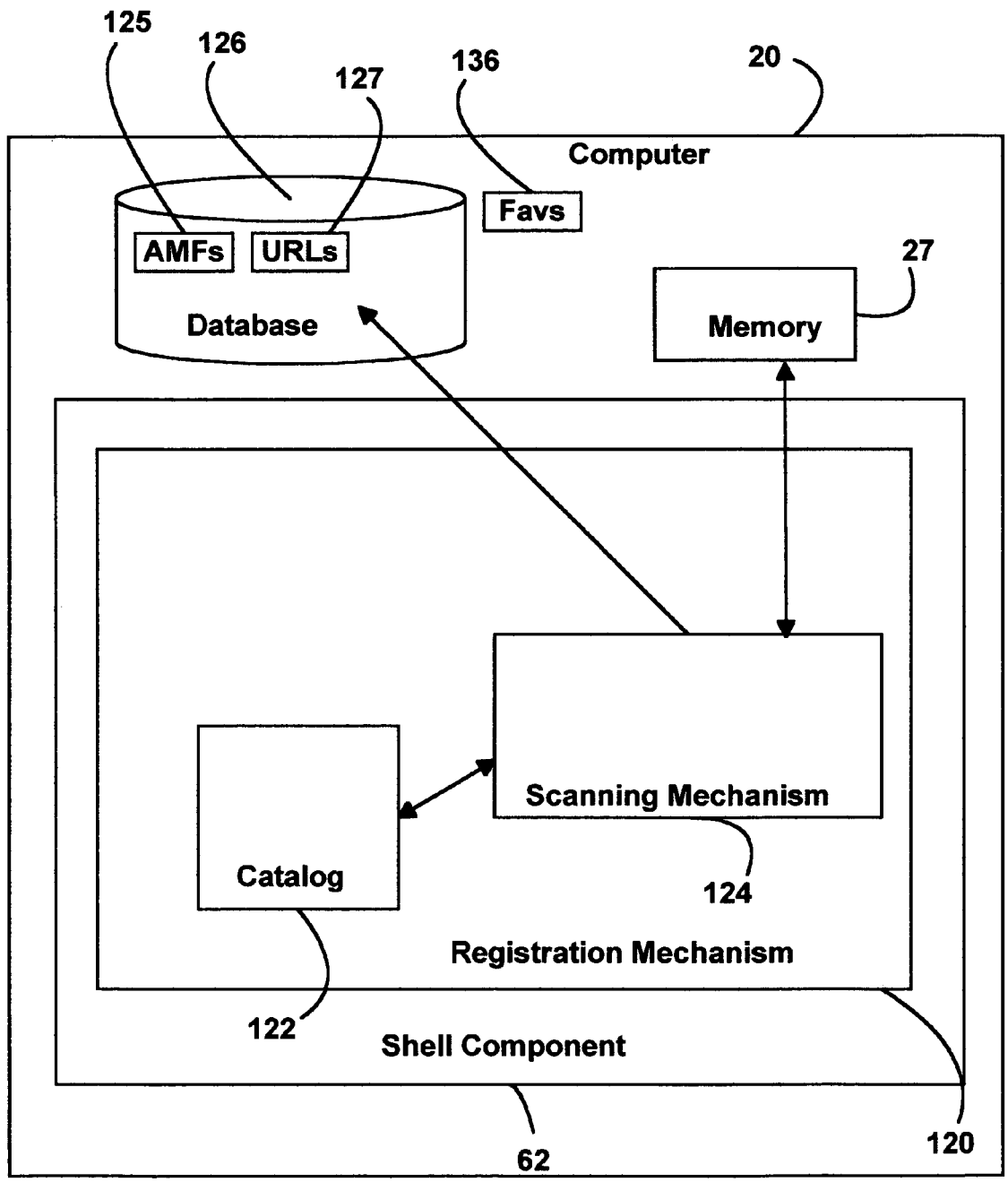
FIG. 6 is a block diagram representing a registration mechanism in accordance with the present invention.

To search for and register programs 36 with the appropriate program pages, the shell component 62 includes a registration mechanism 120 (FIG. 6) that finds programs that should be associated with Activity Center pages or the start page 70, and registers those programs with the respective pages. For this purpose, the registration mechanism 120 includes a catalog 122 having an extensive list of existing programs, and a scanning mechanism 124 for comparing the programs on the computer with those in the catalog 122. When the shell user interface 60 is installed on a computer (e.g., the personal computer 20), the scanning mechanism 124 scans local drivers (e.g., the hard disk drive 27) on the personal computer for programs $36_1$-$36_M$, and compares those programs against the list in the catalog 122. Once a match is found, the scanning mechanism 124 writes information 125 (from the catalog 122) regarding the program 36, such as in the form of a text file, called an Application Manifest File (AMF), into a unified database 126.

The AMF is preferably an XML (extensible markup language) file with a schema describing information regarding the program. The information within the AMF 125 may include a variety of information, but as an example includes the following:

(1) Name of the application program/web-site
(2) Company info (including the URL to the home page)
(3) Copyright info
(4) License info (including the URL to the license agreement)
(5) Support info—phone number, URLS, etc.
(6) Rating
(7) Categories (appropriate activity centers)
(8) Various entry points
(9) Capabilities and keywords (for cross-app search)
(100) File associations The following is an example XML format:
<?xml version="1.01"?>
<?xml:stylesheet type="test/xsl"href="http://www.microsoft.com/XYZ/register.xsl"?>
<APPLICATION>
<TITLE>Microsoft Greeting Card</TITLE>
<MANUFACTURE HREF="http://www.microsoft.com">Microsoft</MANUFACTURE>
<CATEGORIES>
<CATEGORY>Photography</CATEGORY>
<CATEGORY>Home and Family</CATEGORY>
</CATEGORIES>
<CAPABILITIES>
<CAPABILITY>Create a greeting card</CAPABILITY>
<CAPABILITY>Create a birthday card</CAPABILITY>
<CAPABILITY>Create an invitation card</CAPABILITY>
<CAPABILITY>Create a thank-you card</CAPABILITY>
</CAPABILITIES>
<RATING HREF="about:Youxll see rating information here">General</RATING>
<LICENSE HREF="about:You'll see the license agreement here">Per- machine<LICENSE>
</APPLICATION>

As can be seen, the above example is an AMF for the program "Microsoft Greeting Card". The program is assigned the categories of "Photography" and "Home and Family". Thus, upon registration, the program is registered with the Photography Activity Center page 110*a,* and a Home and Family Activity Center page 110*b.* In addition, the program is registered with the start page 70. A program 36 may be registered with one or more Activity Center pages, or even none. Preferably, all programs are registered with the start page 70.

The AMF lists four capabilities for the program: "Create a greeting card", "Create a birthday card", "Create an invention card", and "Create a thank-you card". These four capabilities are tasks that may be performed by the program "Microsoft Greeting Card". As is described further below, the capabilities also define the entry points for the tasks, so that the shell user interface 60 can direct a user to the correct location in the program for performing the task.

As is explained further below, maintaining the AMFs 125 in the unified database 126 permits the information in the AMF to be queried. As is described further below, queries of the information can be used to determine the appropriate items to display on a page (e.g., tasks to display in an Activity Center page). For example, after registration of the Microsoft Greeting Card program, the listed capabilities are associated with the Photography Activity Center page 110*a* and the Home and Family Activity Center page 110*b.* A query that requests all tasks associated with the Photography Activity Center page 110*a* returns the four capabilities registered with the Microsoft Greeting Card program and tasks from other programs that are associated with the Photography Activity Center page 110*a.*

Additional keywords for a search may be provided in the AMF (e.g., in the capabilities section). Having all capabilities, keyboards, and related program information in one database permits a user to broadly request a search query without having to know the particular web page or program to which the query must be directed.

The registration mechanism also writes URL association information 127 into the unified database 126. The URL association information 127 maintains information about the location of the program via a uniform resource locator (URL).

Figure 7:
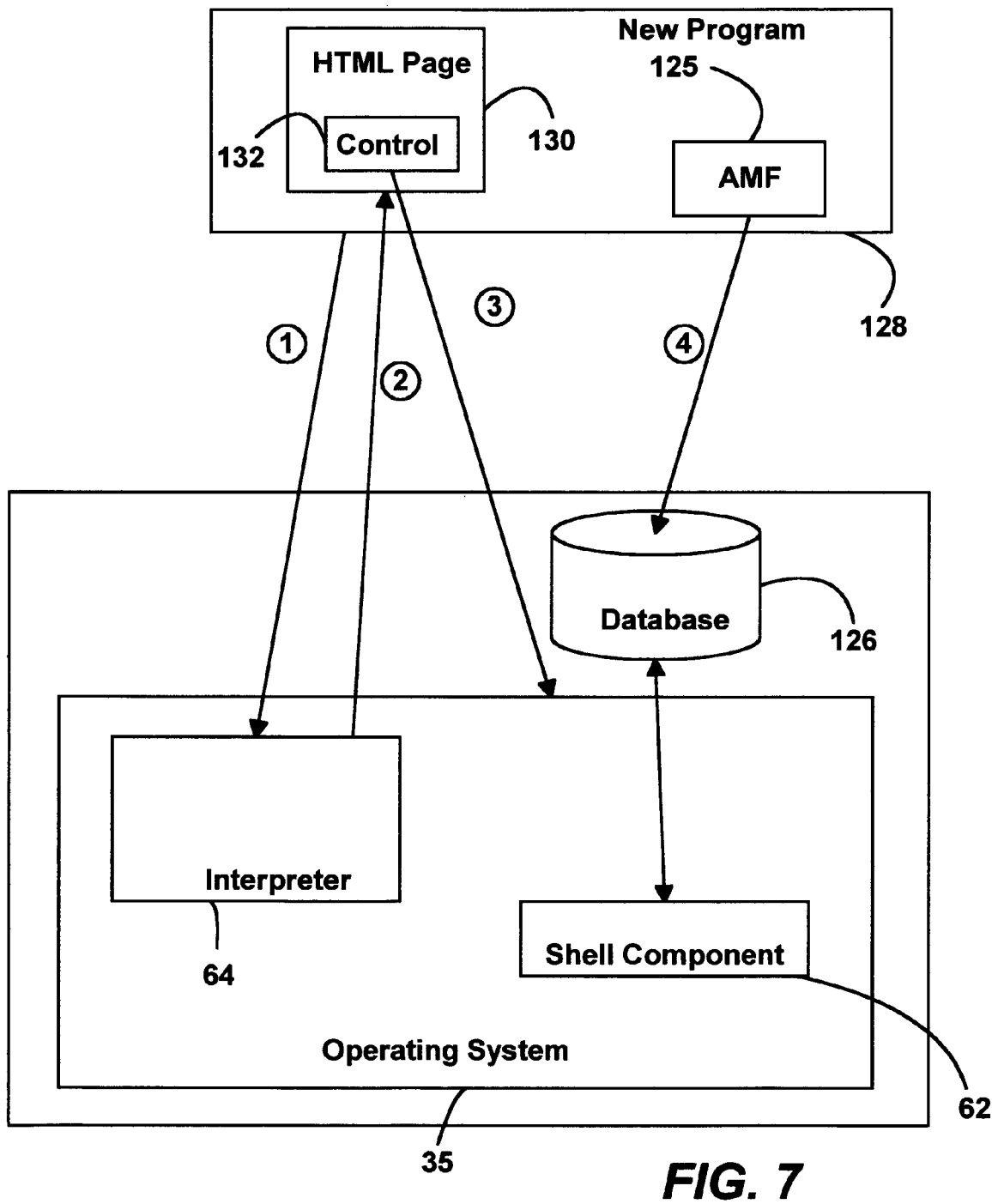
FIG. 7 is a representation of steps for registering a program with the shell user interface.

If the multiple-page shell user interface 60 is already resident on a personal computer, and a new program is installed, the new program preferably includes the AMF in metedata for the program. As is shown in FIG. 7, an application program 128 initiates registration by asking network access software (e.g., the interpreter 64) to navigate to the program's AMF 129. One way to do this is, at the beginning of loading a program, the program 128 provides a message handler 130 (e.g., an HTML page) to the user. The message handler describes precisely what registering the program will do to the user's shell user interface 60 (add a program link to particular Activity Centers, for example). If the user agrees with the course of action, the user clicks on a hyperlink on the page 130 to initiate registration of the program 128. In response, a control 132 (e.g., an ActiveX control) makes a call to register the program (e.g., via a private system API) with the operating system 15. The AMF 125 is then loaded into the unified database 126. Alternatively, a series of message handlers 130 could be provided to the user to request permission to register separate tasks with particular programs (e.g., a message handler may state "Would you like to register the task or program X with the Activity Center Y?").

Message handlers may be used in any situation where data is to be downloaded from, or resident data or settings are to be altered by, a remote source (e.g., the remote computer 49). For example, message handlers may be used when adding items to a Favorites folder, or when creating an Activity center.

The AMF 125 may be loaded without user interaction, such as by utilizing an executable to automatically load the AMF from the program. Using a message handler is a preferred method because it prevents alteration of the shell user interface without the user's consent.

Web pages (or websites) 65 are registered with the unified database 126 in a similar manner. A list of popular web pages are included in the catalog 122, and upon loading the shell user interface 60 onto a personal computer, the scanning mechanism 124 finds saved URLs on the personal computer and writes an AMF into the unified database 126 for each of the matching web pages. URL association information 127 is also written into the unified database 126. When a link to a web page is saved to a personal computer having the shell user interface 60 installed, the web page preferably has an AMF associated therewith (e.g., identified or embedded in a web page). The AMF is saved to the unified database 126 in a similar fashion (e.g., via a message handler or an executable).

To save the MAF to the unified database 126, a hyperlink (e.g., a hyperlink with a title "Bookmark this Page") to the AMF is provided on the web page. The user clicks on the hyperlink and the AMF is saved to the unified database in the same way as a program (i.e., via a message handler 130, an executable, or the like).

If an AMF is not provided by a website, then an AMF for the website may be obtained via the catalog 122, if available. If not available in the catalog 122, a catalog may be provided at a remote location (e.g., a webside). Maintaining the catalog at the remote location provides a benefit in that it may be updated as needed when websites become available or are altered.

Web links 65 may also be tagged by a user, while surfing websites and/or pages (e.g., via a browser). For example, Microsoft Corporation's Internet Explorer browser permits a user to Tag websites and save them to a "Favorites" folder. Similarly, the present invention permits such tagging, and further defines folders that are tied with Activity Centers so that a saved web link is associated with a particular Activity Center. However, in the present invention, the Favorites list preferably also permits tagging of links to documents, pages within the shell user interface 60, and programs. The ability to tag a Favorite is preferably pervasive throughout the computer user's experience, so that an item may be marked at any location during navigation, such as a particular website, a document, a dialog box (or separate page) within an application or program, or a program link. The Favorites list therefore includes links to desired programs, content, documents, or the like, whether the locations are local or remote. Items can be added to a Favorites folder via a "Save to Favorites" button 135 on the task bar.

Figures 12, 13:
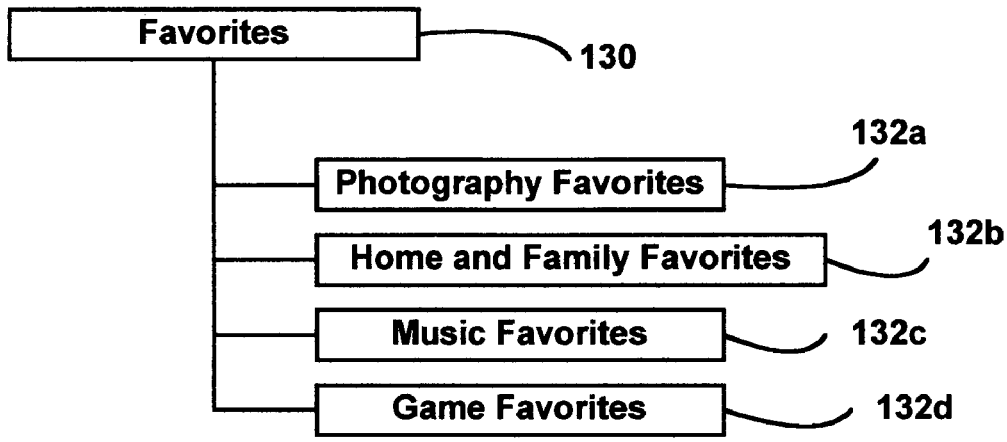
FIG. 12 is a representation of a node tree of a Favorites folders for use with the shell user interface.
FIG. 13 is a representation of tile object information for defining a tile for display in the shell user interface.

FIG. 12 shows a hierarchy for the Favorites folders 136 in accordance with the present invention. As can be seen, at the top of the hierarchy is a Favorites folder 136, and hierarchically below that folder are arranged separate folders 138a-138d for the Activity Center pages 110a-110d. A user may save a link into any folder 138, 138a-138d. The Favorites folders may be maintained anywhere on the computer 20 (e.g., file storage 27). The folders may be queried by pages in the shell user interface 60, as is described further below.

If a web page is tagged to a Favorites folders, the registration mechanism 120 may still download an AMF for the web page into the unified database 126. To permit AMF information to be associated with the unified database, a web page may embed a special LINK tag on the page so that the shell component 62 uses the appropriate AMF when the user adds the page to the Favorites folder using a network access software user interface. The LINK tag may look like this:

<LINK rel="amf" href="http://www.microsoft.com/greetingcard.xml">

Alternatively, tagging a web page with a Favorites folder may automatically write the AMF into the unified database 126 (via an executable, for example).

Registration may also place links into Favorite folders for Activity Centers or the start page 70. To do this, the catalog may include information particular websites 65, types of documents 38, programs 36, or tasks that may be placed into a Favorites folder. The respective link is placed (or is prompted to be placed via a message handler 130) into the appropriate Favorites folder upon loading of the shell user interface 60. Alternatively, upon loading a program or saving a website, the program, related tasks, or website may be registered with particular Favorites folders.

Programs Headings and Pages

As described above, a defined number (five) of program hyperlinks 104a-104e are embedded under the Programs heading 90 on the start page 70 (FIG. 3) so as to form a list. Selecting (i.e., clicking on) a program hyperlink 104a-104e in the programs list launches that program or, if already running, may navigate to an already running instance of the program.

The hyperlinks section under the Programs heading 90 is data-bound to a query with the unified database 126. The query defines the number of programs hyperlinks 104a-104e, and the particular hyperlinks, that are listed in the section. The designer and/or the user may modify the query so as to change the number of program hyperlinks 104a-104e, and/or the basis upon which they are shown. For example, one query for the program hyperlinks 104a-104e on the start page 70 is based on a most frequently used (MFU) algorithm. Thus, as an example, the section under the Programs heading 90 is data-bound to a query, "links to the five most frequently used application programs that are registered with the start page sorted by usage". Thus, an algorithm is applied to the programs that are registered with the start page 70 (maintained in the unified database 126) to determine the five most frequently used programs. The structure of the most recently used (MRU) algorithm is design dependent, but may be based upon the number of times an application is visited during a time period, a matter of time the application is open during a time period, a combination of the two, or other factors. The program hyperlinks 104a-104e may alternatively be listed according to a most recently used (MRU) algorithm. In addition, the Programs hyperlinks 104a-104e under the Programs heading 90 may include one or more persistent programs that are always present.

If a particular program hyperlink 104a-104e is not shown in the list on the start page 70, that program link may be found by clicking on the Programs header 90 so as to navigate to a Programs page 102. As can be seen in FIG. 8, the Programs page 102 includes two areas (i.e., panes): a primary area 142 on the left side the page, and a secondary area 144 on the right side the page. The primary area 142 displays the programs registered with the start page 70, via a list of program hyperlinks 104f-104l and program groups 146a-146e (underlined in FIG. 8). Program groups 146a-146e are folders having other program groups and/or programs therein. As with the Programs list on the start page 70, the list is data-bound to the primary area 142 by a query, such as "links to the application programs that are registered with the start page sorted by usage".

Selecting a program hyperlink 104f-104l launches the program. Selecting a program group 146a-146e opens the sublevels (program links and/or other program groups) for that program group and displays it on the page. Note that the hyperlinks 104a-104e that are displayed on the programs list on the start page are also normally included in the list of hyperlinks included in the primary area 142 of the Programs page 102, but only one (104a) is currently visible in the viewable portion of the primary area shown in FIG. 8.

The secondary area 144 displays links 145a-145c to tasks associated with program management. For example, the following tasks are shown: "Remove a Program" 145a, "Change a Program" 145b, and "Add a New Program" 145c. These tasks may be modified as needed by the designer or user. Clicking on a task link 145a-145c either starts the operation associated with the task, or opens an associated task page 147a-147c (FIG. 3) in which the task is accomplished. Variations may be incorporated in which a program in the primary area is selected and a task is started, for example.

Each Activity Center page 110a-110d preferably includes a Programs heading and section similar to those provided on the start page 70. However, for each of the Activity Center pages 110a-110d, the primary section is data-bound by a query that limits the programs to those that are registered in the unified database 126 as being associated with the respective Activity Center. For example, the query for the section under the Programs heading 90a on the Photography Activity Center page 110a may be: "links to the three most recently used application programs that are registered with the 'photography' category or that have been tagged to the photography Favorites folder". Each of the Activity Center pages 110a-110d also include an associated Programs page (not shown, but similar to the Programs page 102 for the start page 70), each of which includes links to tasks and a list of programs registered as being associated with its respective Activity Center.

Document Maintenance

A representation of a file node tree 150 for use in maintaining organization of the documents $38_1$-$38_M$ is shown in FIG. 9. As can be seen, each of the Activity Center pages 110a-110d and the start page 70 point to a default folder on the computer. For example, the start page 70 points to a My Files folder 152, the Photography Activity Center page 110a points to a My Pictures folder 154, the Music Activity Center page 110c points to a My Music folder 156, the Home and Family Activity Center page 110b points to a My Documents folder 158, and the Games Activity Center page 110d also points to the My Documents folder 158. An Activity Center page 110a-110d and/or the start page 70 may be modified to point to any folder (or more than one folder), but preferably each of the target folders for the Activity Center pages are sub-folders of the folder for the start page 70 (i.e., the My Files folder 152). By arranging the folders in this manner, the user may open the target folder for the start page 70 and may access and navigate to folders for the Activity Centers.

When a document is saved that is created from a link from the start page 70 (e.g., created from a program registered with the start page), the user is prompted to save the document in the default folder (i.e., the My Files folder 152). If desired, the user may navigate to or otherwise select somewhere else to save the document.

Figure 10:
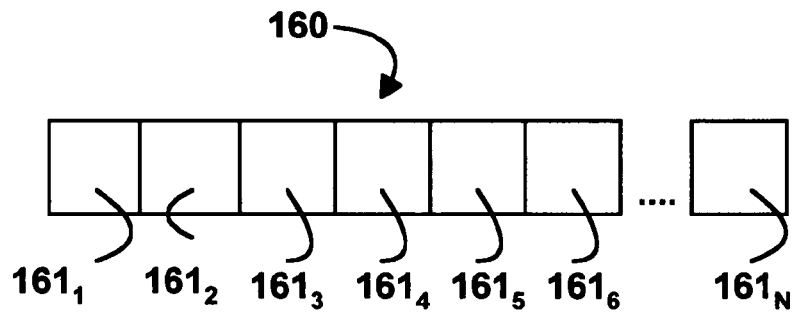
FIG. 10 is a representation of a Recent Documents queue for use in the shell interface.

Links to documents on the personal computer 20 are maintained in a Recent Documents queue 160 (FIG. 10) for the start page 70. The Recent Documents queue 160 is preferably an unfiltered list, i.e., a queue that includes information about documents $161_1$-$161_P$, regardless of type (e.g., documents, web links, pictures, wav files, etc.), visited by the user. The Recent Documents queue 160 maintains information about some number of the user's most recently used (MRU) documents. In a preferred embodiment, the MRU queue list is driven by a document's Last Accessed time property, which is updated when a document is creased, opened, or used as a target. However, other properties may be used. The Recent Documents queue 160 is preferably maintained in the unified database 126 (FIG. 6), but may be maintained elsewhere, e.g., in a file on the hard disk drive 27 in the personal computer 20.

Each Activity Center page 110a-110d has a similar Recent Documents queue 160a-160d (FIG. 11), preferably maintained in the unified database 126. If desired, when the shell operating system 60 is loaded onto a computer, each of the Recent Documents queues 160-160d are populated by documents in the Activity Center target folders 152-158. Alternatively, the Recent Documents queues 160-160d starts empty and is populated as documents are saved, created, or used as a target. After the shell user interface 60 is installed, the Recent Documents queues 160a-160d for the Activity Centers are maintained as filtered (e.g., by queries) lists of information about the user's most recently accessed documents that are associated with the respective Activity Center, either by file type or by explicit tagging.

Figure 11:
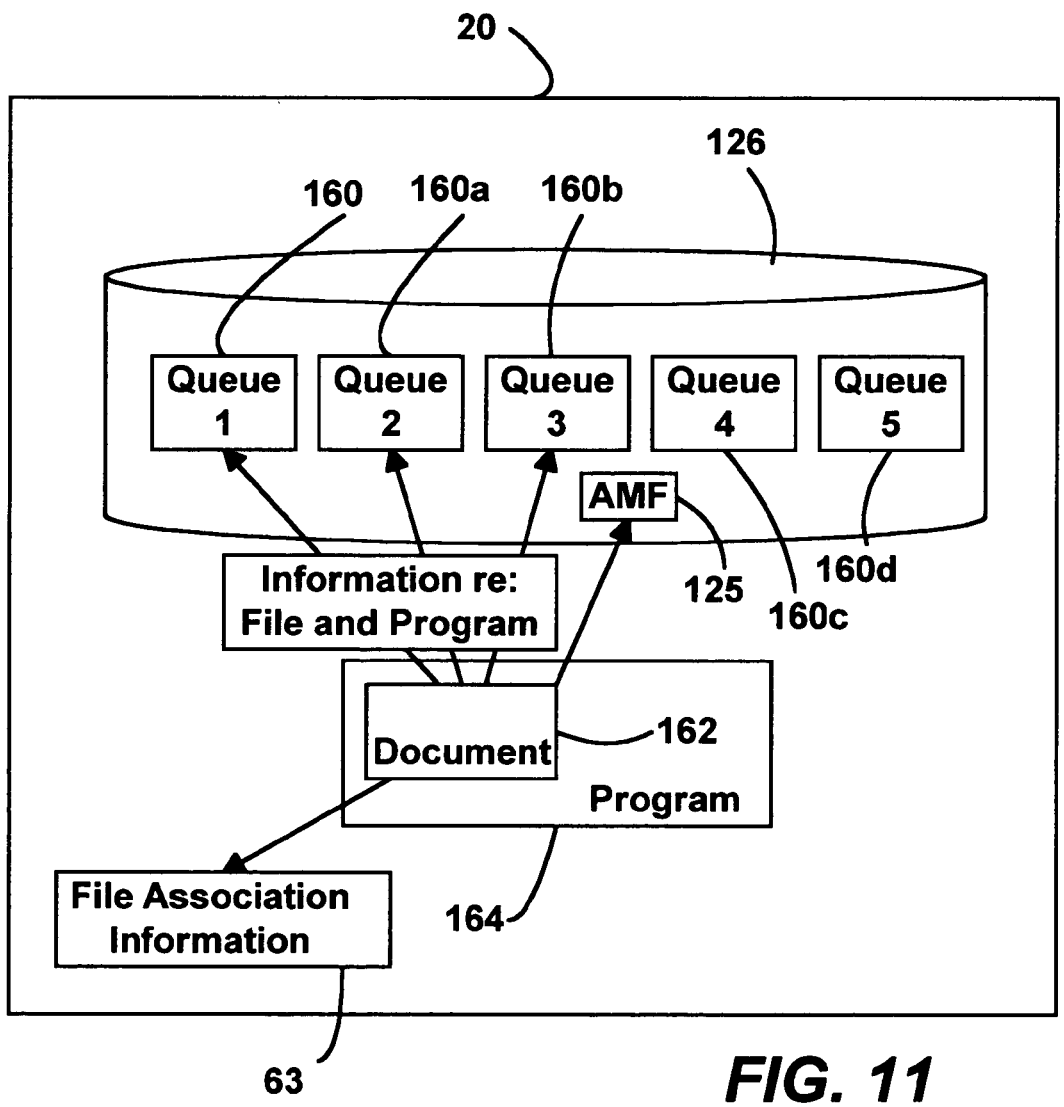
FIG. 11 is a block diagram representing a document registration in accordance with the present invention.

When a document is registered by file type, the document is placed into the Recent Documents queue of every Activity Center for which a program associated with the document is registered. The file association information database 63 and the AMT 125 are consulted to match the document with the program, and the program with the Activity Centers, respectively. For example, as shown in FIG. 11, for a greeting card document 162 that is created by the Microsoft Greeting Card program 164, information about file association is retrieved (e.g., from the file association information database 63). In this example, the file association information indicates the program for this file type is Microsoft Greeting Card. Then, the AMF 125 is consulted to determine the Activity Center(s) in which the Microsoft Greeting Card program is registered (i.e., Home and Family and Photography). Information about the document 162 is written into both the Home and Family Activity Center Recent Documents queue 160b and the Photography Activity Center Recent Documents queue 160a. Information is also written into the start page's Recent Documents queue 160 because, as described above, information about documents is maintained in the start page's Recent Documents queue.

Documents are tagged when they are saved to an Activities Center Favorites file 136, 138a-138d. To save the document to a folder, the "save to Favorites" button 135 is clicked while the file is open. A page or dialog box (not shown) is opened that allows the user to select the Favorites folder in which the document will be saved.

Additionally, a document may be tagged to an Activity Center page 110a-110d from which a program was started when the document changes a property (e.g., is created, opened or used as a target by the program). For example, for a file created in the Microsoft Greeting Card program, information is maintained about the page origination of the program or website (i.e., exactly what Activity Center page or the start page was used to start the Microsoft Greeting Card program was started), and information about the document is written into the Recent Documents queue for the Activity Center.

One way to maintain information about page origination is to generate page origination information when the program is started, and associated that information with a document when the document is created, opened or used as a target (for example, by writing information about the document into the appropriate Recent Documents queue). The program may be started via either a document link, a web link, or a program link. The document can be associated with the origination page, regardless of source. For example, if the program is opened via a program link, then the document is associated with the page in which the link is located. To start a program by clicking on a document or web link, the link is selected, the document or web link is associated with the appropriate program or executable code via the information in the file association database 63, the program is started, and the document or web link is loaded into the program. Page origination information may be maintained in the program (e.g., for later associating that information with a document created, opened, or saved as a target from the program). The origination information may be generated when the document or web link is associated with the appropriate program or executable code via the information in the file association database 63.

The page origination information may be tied to page visits other than the page from which a program is started. For example, page information may be kept regarding the link through which a document is loaded into a program (e.g., a document link is selected, loading a document into an already running program), and that document loading page information determines the Activity Center with which the document is associated. Other page information, or logical combinations of page information, may be used.

Recent Documents Headings and Pages

As described above, a defined number of document hyperlinks 106a-106e are displayed on the start page 70, below the Recent Documents heading 92. The area below the Recent Documents heading 92 is data-bound to a query, preferably the five most recent documents from the Recent Documents queue 160. However, the queue 160 does not have to be used, instead one or more queries could data-bind the area to retrieve the documents that would be in the queue, or different queries could be used to data-bind the area with particular documents. As with the programs list, the number of document hyperlinks, and the query for those hyperlinks, may be customized by the designer and/or user.

The hyperlinks 106a-106e may be displayed alphabetically or according to other design criteria, but preferably are displayed temporally. When listed in a temporal order, revisiting a document that is already displayed on the start page 70 preferably does not move its physical location (i.e., the location that is visible to a user) on the list. By maintaining the same location for a document, a user maintains spatial memory for the document, which aids in returning to the document at a later time.

Figure 3:
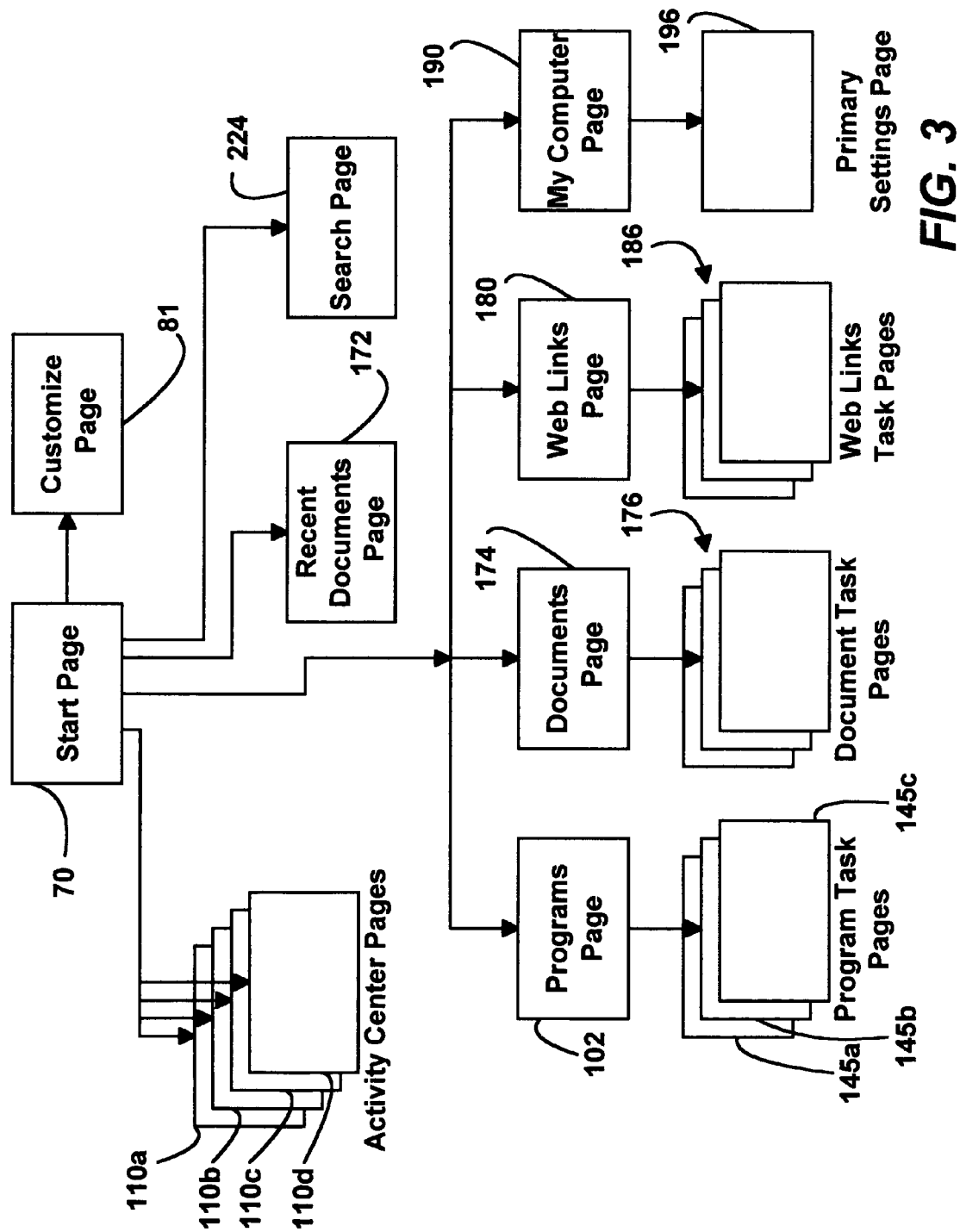
FIG. 3 is a representation of a page hierarchy for a multiple page shell user interface in accordance with the present invention.

Clicking on a "More Recent Documents" link 170 (located below the list of document hyperlinks 106a-106e in FIG. 4) navigates to a Recent Documents page 172 (FIG. 3). The Recent Documents page 172 displays documents under the query for the start page, but is not necessarily limited by number (e.g., all documents registered with the Recent Documents queue 160). Documents may be displayed on the list alphabetically, temporally, or according to other design criteria.

Similarly, each Activity Center page 110a-110d displays a defined number of hyperlinks to its related documents, and includes its own equivalent of a "More Recent Documents" hyperlink and page. For example, there may be a "More Recent Albums", "More Recent Music", "More Recent Documents", or the like hyperlink and the associated page, depending upon the Activity Center. As with the start page 70, the area under the respective Recent Documents heading and the Recent Documents page for each Activity Center is data-bound to a query. For example, the query may be documents that are registered with the corresponding Recent Documents queue 160a-160d. The query may also include documents of a particular type (e.g., wav files for the Music Activity Center, photo files for the Photography Activity Center and so forth). In addition, the query may include documents saved into a particular Activity Center Favorites folder 138a-138d.

Clicking on the Recent Documents heading 92 on the start page opens a Documents page 174 (FIG. 3). The Documents page 174 shows the contents of the default folder for the start page 70. Similarly if the Recent Documents heading for one of the Activity Centers (which may be "Recent Documents", "Recent Albums", "Recent Music", or the like) is selected, the contents of the default folder for that Activity Center is shown. The Documents page 174 may also include tasks (not shown, but similar to those described for the Programs page) for file management. For example, tasks for deleting, moving, renaming, or even tagging a document to another Activity Center may be provided. Document task pages (shown generally at 176 in FIG. 3) are provided for displaying the tasks.

Web Links Headings and Pages

The section under the Web Links heading 94 on the start page 70 includes the links 108a-108c to saved web URLs. Three links 108a-108c are shown in FIG. 4, but the number of links may be customized by the designer and/or user. The section under the Web Links heading 94 is data-bound to a query, e.g., the links to the three most frequently used (MFU) saved websites. The section may also be bound to other queries, such as one that retrieves links based on a most recently used (MRU) algorithm, or even compound queries. Persistent URLs may also be placed in the list by the user and/or designer.

In accordance with one embodiment of the present invention, the section under the web links heading 94 is data-bound to a query with a remote source (e.g., a website or an Internet Service provider). As examples, the query for the section may request links to the most popular websites of a certain category (e.g., the five most popular photography websites), or may request links that direct a user to downloadable content (e.g., "the five most popular games that you have not played"). Other queries may be defined as desired by a designer. Web links from the remote service may be cached, and the cache may be queried so as to provide links in the section. The query may include a requirement that a particular web link not be shown to a user more than a certain number of times (e.g., "the five most popular photography websites that have not been displayed on the user interface more than three times"). The remote source may push web links into the cache so that the web links may be changed even if not connected to the remote source. Thus, a large number of variations are available for the presentation of web links to a user.

Clicking on the Web Links heading 94 navigates the user to a Web links page 180 (FIG. 3). The web links page 180 for the start page 70 displays a list of all links to websites stored on the personal computer. The web links may be stored in any desired order, e.g., alphabetically.

Activity Centers include similar Web links and pages, but the web links displayed on Activity Center pages 110a-110d are limited to those that are registered as being associated with the particular Activity Center. Alternatively, the section for web links may be data-bound to a query with a remote source as described above. The Web links pages and the sections under the Web links headings may be data-bound to the web links in the Favorites folder 132a-132d for the particular Activity Center, as well as the websites registered with the Activity Center.

If locally saved web locations are used, registered links and web links tagged by a user as being associated with a particular Activity Center's folder are displayed under the Web links heading and/or at the Activity Center's Web links page. The Web links page 180 associated with the start page 70, on the other hand, displays all currently saved web links.

The Web links pages may include tasks (not shown, but similar to those discussed with reference to the Programs page 102). For example, tasks for deleting, moving, or renaming a web link may be provided. Document task pages (shown generally at 186 in FIG. 3) are provided for displaying the tasks.

My Computers Heading and Page

Clicking on the My Computer heading 96 navigates to a My Computer page 190 (FIG. 3), where links (not shown) are provided to components, settings, and systems of the personal computer 20 (e.g., settings, support, user storage, and device storage, for example). A Change Settings link 194 (FIG. 4), which is provided on the start page 70 under the My Computer heading 96, navigates to a primary settings page 196 (a child page to the My Computer page 190), where links to files and systems directed to the settings of the personal computer 20, such as Control Panel settings and the like, are accessible.

Device Links

If desired, the start page 70 and/or the Activity Center pages 110 may include a links to one or more external devices, such as the external device 197 (FIG. 2). For example, a photography Activity Center page may include a link to a camera. As another example, a link to a printer may be provided on the My Computer page 190. Selecting the link to the device may, for example, open a page directed to the settings of the device, or may direct a user to a task page that is directed to use of the device (e.g., a camera link may navigate to a program page in a photography program directed to downloading photographs from a camera).

The external devices may be registered via the catalog 122, or via a remote catalog as described above. In addition, if desired, a device may be added to a page by a user.

Tile Views

Programs, documents, web links, or tasks be displayed as a tile having both a link to the program, document, web link, or task, and additional item links exposed for the program, document, web link, or task. Different items may be displayed in a tile. For example, FIG. 5 shows tiles 200a-200c for albums, each having the album's heading 201a-201c, a photo 202a-202c from the album, and titles 203a-203c representing a group of pictures (e.g., one roll of film) in the album. Alternatively, icons for a plurality of photographs and/or thumbnail views of the photographs may be displayed. As another example, a list of programs may be displayed as a list of tiles, each tile having a large icon and a title for the program, and a number of tasks (e.g., three) associated with the program. The tasks may be bound to the tile by a query, e.g., the three most recently used (MRU) tasks associated with the program.

Tile information is saved as an object. The object includes information about the name of the main item (for example, the album in the example given above), and further information disclosed in the tile, such as the location of an icon for the main item (which may also be displayed in the tile), and information about location or description of other items that may be displayed by the tile.

Example information 210 included in a tile object is shown in FIG. 13. The information 210 includes the name of the main item in the form of a string (e.g., "Recent Photographs" for the tile 200a in FIG. 5), URL information (e.g., c:\program files\word.exe for Microsoft Word), information about the location of an icon representing the main item (e.g., the URL for a JPEG image, for example), the locations of a list of alternate icons that are available for use with the main item ("Program Icon Set"), and the location of the tile template ("Rich View Template"). The tile information 210 also includes the description of and/or location of items associated with the tile (e.g., tasks, a photo, or number of photos).

The tile information 210 is stored anywhere on the computer 20 (e.g., in a file on the hard disk 27). A section in a page (e.g., a section in the start page 70 or in an Activity Center page) may be data-bound to a query that requires the tile view. If so, the tile information 210 is retrieved, and the tile is displayed in the section, and is filled with the appropriate items (which may be defined by another query).

The tile information may be used to provide a variety of different displays. For example, the tile information may also be used to display only a heading, only an icon, or a heading and an icon. In that case, the tile information is retrieved, but only the necessary information about the item is displayed (e.g., the title or the title and the icon).

Tasks Headings and Page

In general, a task is a process that a program may perform. A task may be any location or process that a program can present, and is an entry point to a specific place in a program. A task may include loading of a template for operation of a process. Selecting a task link either initiates the program's process, or opens a task page that is directed to the process. For example, clicking on a link entitled "Create a Greeting Card" open a separate task page in a greeting card creation program, and loads the template for a greeting card. As another example, a task entitled "Print Preview" may direct a user to a "Print Preview" screen in a word processing program, even though the word processing program may not be open. Selecting a document and then selecting the Print Preview task may open the selected document in the Print Preview screen. Links to tasks may be provided in an Activity Center page or in the start page 70.

As explained above, a number of Tasks (e.g., the tasks 114a-114e) are displayed under the Tasks heading 112. The section under the Tasks heading 112 is data-bound to a query, such as a MRU query, to display tasks associated with the Activity Center page. The query may have special limitations, such as "only one task per program may be registered with the Activity Center", for example. Clicking on the Tasks heading 112 links to a tasks page (not shown) that displays all tasks registered with the Activity Center. The tasks may be sorted in any order, such as alphabetically or most frequently used. In addition, the tasks may be displayed with programs via tiles, as described above.

Search and Explore Headings and Pages

A data entry field 220 is provided under the Search and Explore heading 98. The data entry field 220 may act upon either a search query or URL (web or local) entry.

When a web URL is entered into the data entry field 220, a search engine 222 parses the URL information 128 within the unified database 126 for information about the website or program. If the URL to the website is found, the search requests the information regarding the association of the URL with the appropriate executable code (e.g., the interpreter 64) from the unified database 126. The executable code then takes the appropriate action with respect to the URL (e.g., network access software is launched to retrieve the associated web page).

A local reference and/or command (e.g., E:\Setup.exe) may also be entered into the data entry field 220. The search engine 222 parses the URL information 125 and/or the file information in the start page queue 160 (these two items may be stored together for convenience). If the local reference is to a document, the search requests the information regarding the association of the document with the appropriate executable code from the file association database 63. The executable code or program then takes the appropriate action with respect to the document (e.g., the program is opened and the document is opened in the program, or the document is opened in a running program). If the local reference is to executable code, the executable code is launched or an already running instance of the program is brought to the front of the display.

When search criteria are entered into the data entry field 220, the search engine 222 first parses information in the unified database 126. As stated above, the AMF for programs and websites includes keyword and capabilities information about the programs and websites. The search engine 222 parses the unified database 126 for matches with the search criteria, and returns a response to the user on a search page 224 (e.g., one or more matches or close matches, or "nothing found"). Because capability and keyword information is provided to the unified database 126, the search is capable of producing a lot more than just a title search of the items. For example, for the AMF described above, the search terms "thank you card" may return the program "Microsoft Greeting Card", even though the search terms are not included in the title of the program. The search may also produce the task or task page associated with creating a thank you card.

If the search criteria are not met (i.e., nothing is found), then the search engine 222 may request or conduct a more comprehensive search over the World Wide Web. The search engine 222 may conduct the broader search itself, or may forward the search criteria to a web-based search engine.

Clicking on the Search and Explore heating 98 opens the search page 224 (FIG. 3) in which is included a similar data entry field (not shown). The search may then be conducted via the data entry field on the search page 224.

A Search and Find data entry field 220a is preferably also provided for each of the Activity Centers (for example, a Search and Find data entry field 220a is provided on the Photography Activity Center page 110a). In response to a search query sent via an Activity Center data entry field 220a, the search engine 222 may perform the same search logic as is described above (i.e., search the unified database). Alternatively, the search engine 222 may focus a query sent from an Activity Center data entry field 220a on programs, websites, and documents that are registered with the Activity Center. To do this, the search engine 222 adds a limiting query to the search query, such as "and is registered with the Activity Center". The search is then focused on AMFs, file types, the Recent Documents queue, and the Favorites folder associated with the respective Category. If the information is not found using the restrictive query, then a broader search is conducted of all documents, programs and websites registered with the unified database 126. If the information is still not found, then a broader search (e.g., via the World Wide Web) may be conducted.

Operation of the Present Invention

Figure 14:
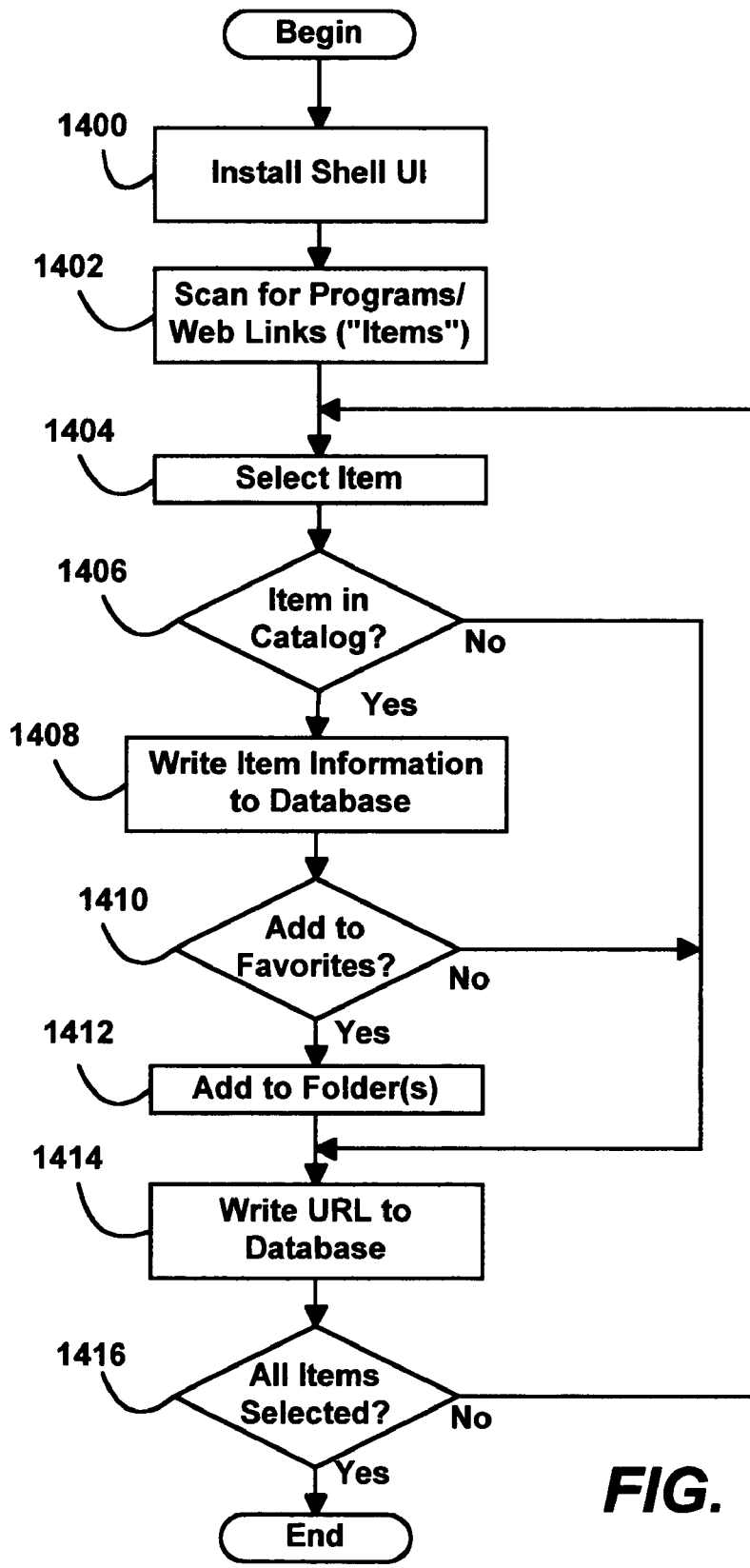
FIG. 14 is a flow diagram generally representing steps for registering resident programs and web links upon installation of the shell user interface in accordance with one aspect of the present invention.

Turning now to an explanation of the operation of the present invention, FIG. 14 shows a general overview of a process for registering programs 36 and web links 65 upon installation of the shell user interface 60 in accordance with one aspect of the present invention. Beginning at step 1400, a user begins installation of the shell user interface 60 (e.g., by loading software via a removable magnetic disc 29 or by downloading software from the Internet or other network). The scanning mechanism 124 then initiates registration at step 1402 by scanning the personal computer for programs and web links ("items").

In steps 1404 and 1406, a found item is compared against the contents of the catalog 122. If the items matches an item in the catalog 122, then step 1406 branches to step 1408, where item information (e.g., the AMF 125) for the item is written from the catalog 122 into the unified database 126. If, according to the information in the catalog, there is a link (e.g., task, programs, or website) to add to one or more Favorites folders 136, 138a-138d, the link is added to the folders in steps 1410 and 1412. If not, step 1410 branches to step 1416.

Also, if an item is not found in the catalog 122, then step 1406 branches to step 1416, where URL information 127 is saved to the unified database 126.

Step 1418 determines if all items have been selected and, if so, the registration process is ended. If not, step 1410 branches back to step 1404 where the next item is selected and the scanning process starts over again.

Figure 15:
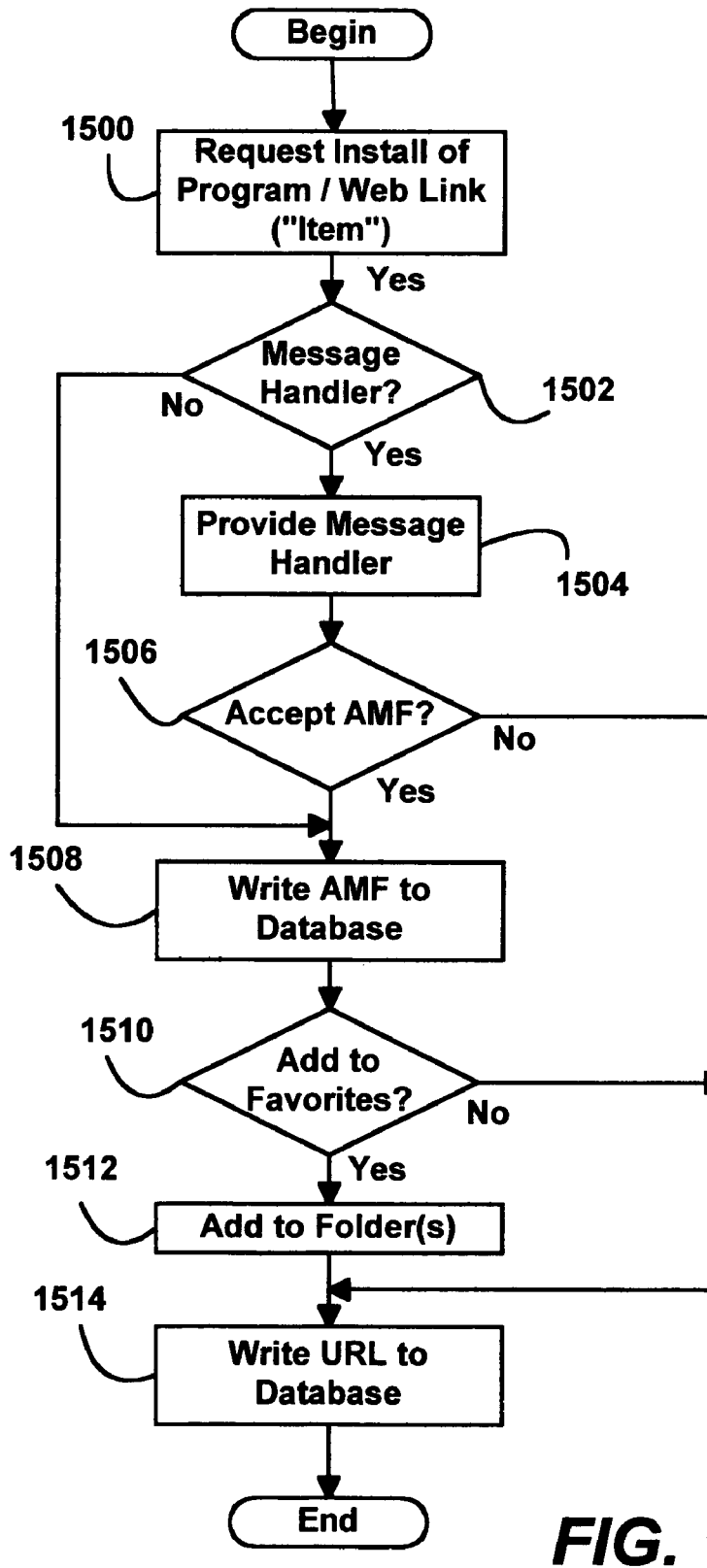
FIG. 15 is a flow diagram generally representing steps for registering a program or a web link that is being installed upon, or saved to, a personal computer upon which the shell user interface 60 is resident.

FIG. 15 shows a general overview of a process for registering a program 36 or a web link 65 that is being installed upon, or saved to, a personal computer upon which the shell user interface 60 is resident. Beginning at step 1500, a user loads program software, or saves a web link, to the personal computer 20. If the item includes a message handler 130, step 1502 branches to step 1504 where the message handler is provided to a user. If the user selects (step 1506), via the message handler, to save the AMF 125 to the unified database 126, then the process proceeds through steps 1508 through 1514. These steps are essentially the same as process steps 1408 through 1414, so a description is not repeated here. If the user does not choose to save the AMF 125, then step 1506 branches to step 1514.

Figure 16:
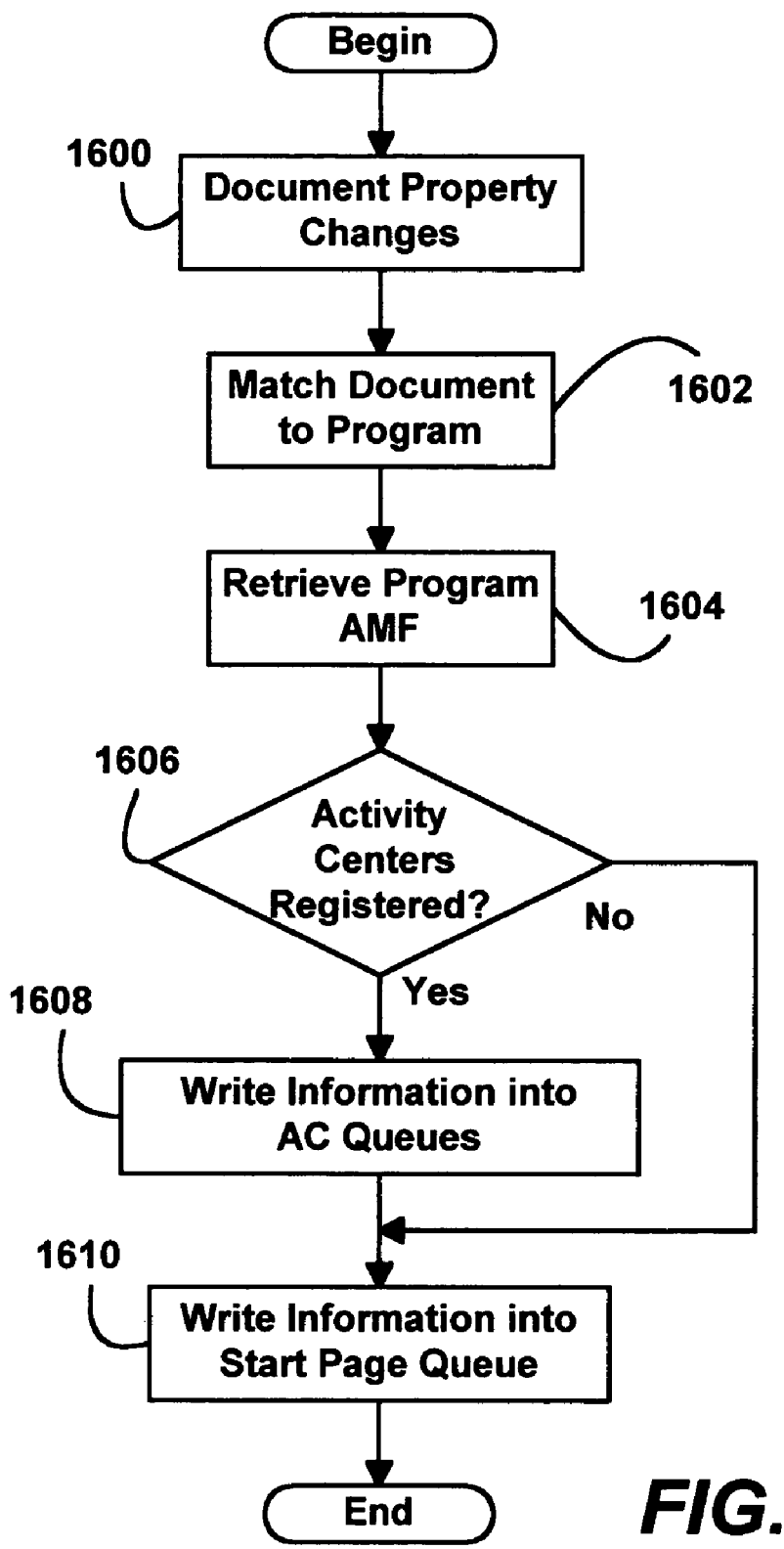
FIG. 16 is a flow diagram generally representing steps for registering a document with the shell user interface in accordance with file type.

FIG. 16 shows a general overview of a process for registering a document 38 with the shell user interface 60 in accordance with file type. To initiate the registration process, at step 1600 a document undergoes a defined property change (e.g., is created, opened, or used as a target). The file association information database 63 and the AMF 125 are consulted to match the document with the program (step 1602), and the program with its AMF (step 1604), respectively.

If the program is registered with one or more Activity Centers, then step 1606 branches to step 1608, where information about the document is written into the Activity Centers' Recent Documents queue or queues, e.g., 160a-160d. If the program is not registered with one or more Activity Centers, step 1606 skips to step 1610.

At step 610, information about the document is written into the start page's Recent Documents queue 160.

Figure 17:
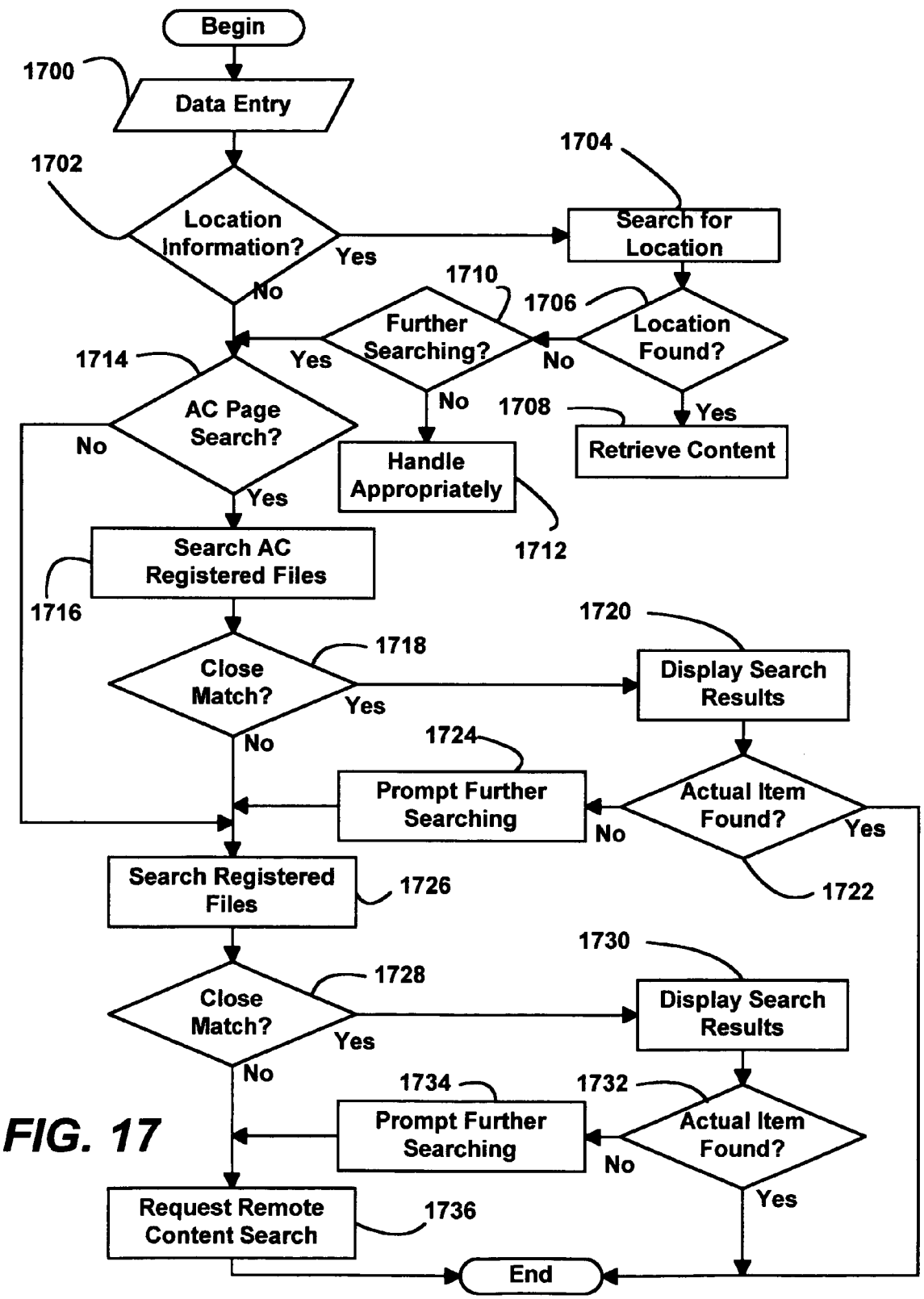
FIG. 17 is a flow diagram generally representing steps for conducting a search utilizing a search engine of the present invention.

FIG. 17 shows a general overview of a process for conducting a search utilizing the search engine 222. Beginning at step 1700, a user enters data in the data entry field 220. If the data is directed to location information (e.g., a local reference or a web location), then step 1702 branches to step 1704, where a search for the location occurs (e.g., check the unified database 126 and/or use network access software to retrieve a web location). If found, step 1706 branches to 1708 where the content or item is retrieved. If the location is not found, step 1706 branches to step 1710, where a query-based search may be conducted. If a decision is made to conduct the query based search (e.g., though user input) step 1710 branches to step 1714 where searching begins. Alternatively, step 1710 branches to step 1712, where the search engine 222 (via the search page 224) handles appropriately (e.g., prompts a user to check spelling, display near misses, or provides an error message, for example).

Returning to step 1720, if the data is not directed to a location, then step 1702 branches to step 1714 where a query-based search beings. If the initial search request was made from a data entry field 220 at an Activity Center page 110a-110d, then step 1714 branches to step 1716, where a search is conducted of information regarding files (documents, programs, and web links) registered with the category. The search engine 222 preferably parses the unified database 126 and related file information.

If a match or close match is found, step 1718 branches to step 1720, where the search results are displayed (via the search page 224, for example). If at step 1722 the actual item is found (i.e., one of the results is the one the user was looking for), the search engine 222 is done, and the item is handled appropriately (e.g., a link is presented to the user on the search page 224). If however, the item is not Found(step 1722), the search engine prompts for possible further searching (step 1724), and if selected, the search engine begins a broader search.

If the search query was not initiated from an Activity Center (e.g., via the start page 70), or if the Activity Center search was not successful (steps 1716-1724), then a search of registered files (i.e., not limited to an Activity Center) is initiated in step 1726.

If a match or a close match is found, step 1728 branches to step 1730, where the match is displayed. Steps 1730-1734 are similar to steps 1720-1724, and will not be repeated here.

If the item is not found via the broader search of registered items, at step 1736 (after no matches are found in step 1728, or a broader search is requested via step 1734) a still broader (e.g., World Wide Web) search is requested. This search may be forwarded to network access software, for a search via an internet search engine, for example.

Figure 18:
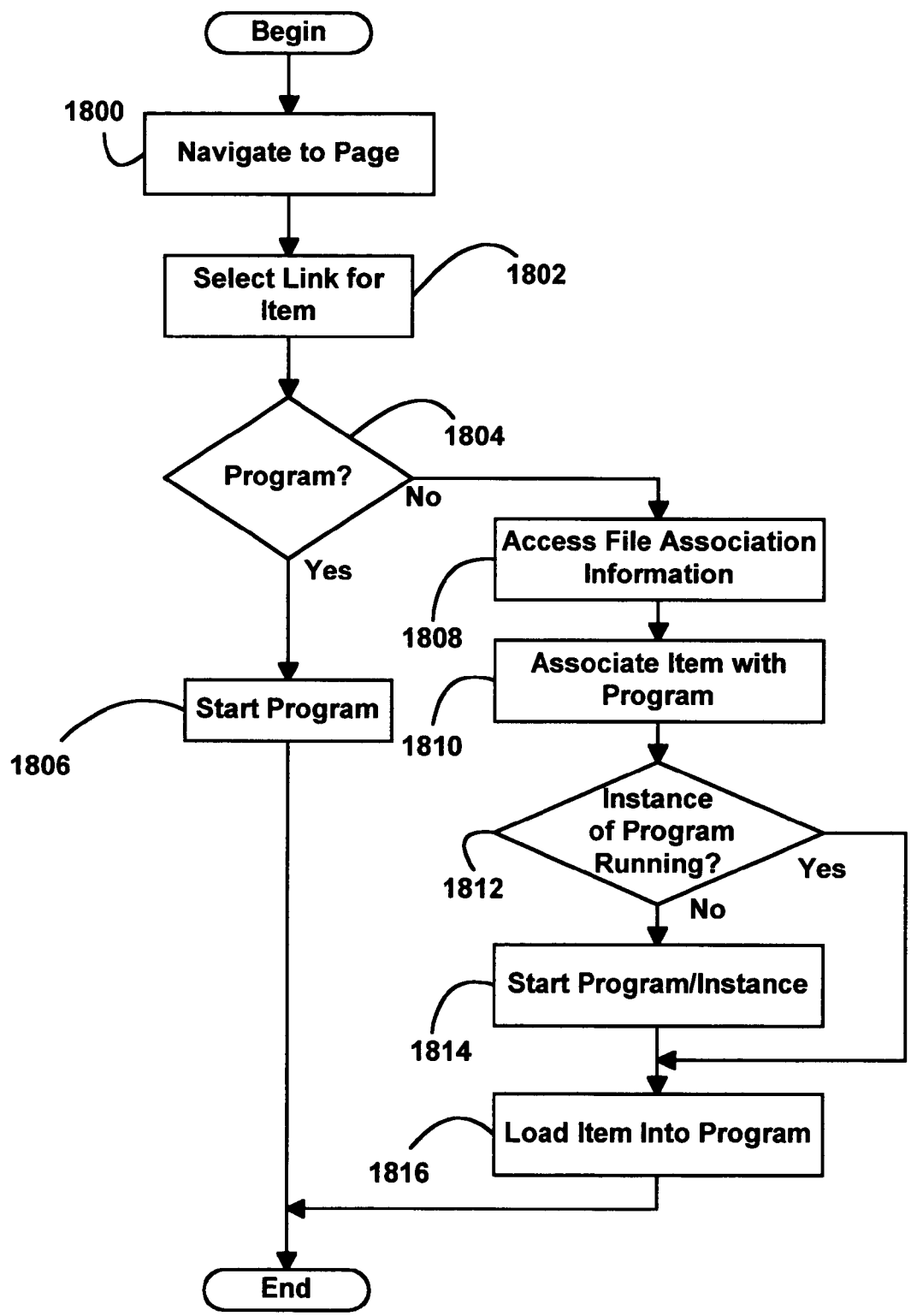
FIG. 18 is a flow diagram generally representing steps for providing and selecting an item on the shell user interface.

FIG. 18 shows a general overview of a process for providing and selecting from a menu on the shell user interface. Beginning at step 1800, a user navigates to a page (e.g., an Activities Center page, a Programs page, a Documents page, or the start page itself) in which the link is located (e.g., by clicking on links to lower order pages or by finding the link via the search engine 222). The link is then selected by the user at step 1802.

If the ink is a program (i.e. executable code) links, step 1804 branches to step 1806 where an instance of the program is opened (or, if an appropriate instance is already opened, the instance is brought up to the front of the display). If the link is not a program link, then step 1804 branches to step 1808, where file association information is accessed (e.g., via the file association database 63). The link is associated with the appropriate program via the file association information (step 1810).

If an appropriate instance of the program is not running, step 1812 branches to step 1814, where the program is started. If the program is running, step 1812 skips to step 1816, where the item is loaded into the program (e.g., the document is loaded into the program, or the web page is loaded via network access software).

The multiple-page user interface 60 of the present invention provides a convenient manner of displaying to a user the content of a personal computer, and provides organization of and access to local information via hyperlinks on the pages. The multiple-page user interface 60 permits the user to logically find documents, programs, and settings of the personal computer. Use of the pages allows links to remote content (via saved web-based URLs) to be logically grouped with the hyperlinks to local information.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing system having a display device and access to local and remote resources, a method for providing a user with selectable links to local and remote resources in a manner that allows a user to easily find and select a desired resource without the user being aware of a source location of the resource, the method comprising:

registering a plurality of local and remote resources at the computing system, wherein registering includes identifying one or more logical relationships between the resources; and automatically, upon an initial start-up of an operating system of the computing system, displaying a user interface which provides hierarchically arranged links to at least some of the plurality of local and remote resources registered at the computing system, wherein the user interface includes:

a shell interface having a start page that includes:

a customized heading region identifying the start page, the customized heading region further including a link for customizing the start page, a hierarchical links region having a plurality of hierarchical categories identified therein, wherein the plurality of hierarchical categories includes an activity center category, and wherein each of the hierarchical categories is visible upon initial display of the shell interface, and each of the hierarchical categories comprising:

a top-level category heading identifying a logical relationship between a plurality of resources, the top-level category heading having a link thereon which, upon selection, removes the start page and replaces it with a second-level category page identifying a plurality of resources which have the logical relationship associated with the top-level category heading, wherein each second-level category page has a page heading region identifying the top-level category heading selected from the start page; and displayed in association with a corresponding top-level category heading, a lower-level list of a plurality of resources having the logical relationship identified by the corresponding top-level category heading, wherein the logical relationship of the plurality of resources in the list and on the category page is unrelated to a source location of the resources, and wherein each item in the list comprises a link to a corresponding one of the plurality of resources, and wherein the list of resources associated with the activity center category links to a plurality of activity center category pages, each of the plurality of activity center category pages having a particular theme and identifying local and remote resources related by the particular theme;

wherein each top-level category heading and the lower-level list of the plurality of resources for each top-level category heading is visible upon the initial display of the shell interface.

2. A method as recited in claim 1, wherein the plurality of hierarchical categories includes a programs category.

3. A method as recited in claim 1, wherein the plurality of hierarchical categories includes a web resources category.

4. A method as recited in claim 1, wherein the plurality of hierarchical categories includes a recent documents category.

5. A method as recited in claim 1, wherein the plurality of hierarchical categories includes a recent programs category.

6. A method as recited in claim 1, wherein the hierarchical links region further comprises a local computing system category for exploring resources locally available on the computing system according to source location of the resources.

7. A method a recited in claim 1, wherein the hierarchical links region further comprises a search category, the search category having a corresponding search heading and search input field.

8. A method as recited in claim 1, wherein at least some of the plurality of category headings of the second-level category page are the same as the category headings of the top-level page, and wherein at least one of the plurality of category headings is specific to the particular second-level category page.

9. A method as recited in claim 8, wherein the category headings of the second-level category page include corresponding lists of resources related by a logical relationship identified by the corresponding category heading, such that the lists of resources corresponding to the plurality of category headings of the second-level category page which are the same as the category headings of the top-level page identify a filtered list of resources from the corresponding category heading of the top-level page, the filtering being done according to the logical relationship associated with the second-level category page.

10. A method as recited in claim 1, wherein the second-level category page identifies a plurality of tasks specific to the second-level category page.

11. A method as recited in claim 1, wherein the plurality of resources include resources that are local to the computing system and resources that are remotely located.

12. A method as recited in claim 1, wherein the link of the customized heading region, upon user selection, allows a user to customize the customized heading region.

13. A method as recited in claim 1, wherein the start page has a default size setting.

14. A method as recited in claim 13, wherein the default setting is maximization of an entire display device associated with the computing system.

15. A method as recited in claim 13, wherein the default setting is to view the lists without scrolling.

16. A method as recited in claim 1, wherein the lower-level list a plurality of resources comprises a predetermined number of resources.

17. A method as recited in claim 1, wherein the plurality of hierarchical categories further includes a programs category, a web resources category, a recent documents category, and a recent programs category.

18. A method as recited in claim 1, the method further comprising:
receiving a signal indicative of user selection of a link in the hierarchical links region; and
taking action in response to the signal.

19. A method as recited in claim 18, wherein receiving user selection of a link comprises receiving user selection of a link associated with a category heading.

20. A method as recited in claim 19, wherein taking action in response to the signal comprises opening a lower level category page, the lower-level category page identifying a plurality of resources having a relationship associated with the category heading of the shell interface.

21. A method as recited in claim 20, wherein the plurality of resources on the lower-level category page are organized into hierarchical lists, each hierarchical list being associated with a sub-category heading.

22. A method as recited in claim 21, wherein a plurality of the sub-category headings are the same as the category headings of the shell interface, and wherein the list of resources associated with the sub-category are a filtered list of resources associated with the same category heading of the shell interface.

23. A method as recited in claim 22, wherein the list of resources are filtered according to a relationship associated with the category heading.

24. A method as recited in claim 21, the method further comprising receiving user selection indicative of link associated with a category sub-heading and, in response, taking action to open a still lower-level sub-category page identifying a plurality of resources having a relationship associated with the sub-category headings of the category page.

25. A method as recited in claim 18, wherein receiving user selection of a link comprises receiving user selection of a resource from one of the lists of the plurality of resources.

26. A method as recited in claim 25, wherein taking action in response to the signal comprises opening a resource.

27. A method as recited in claim 25, wherein taking action in response to the signal comprises starting an application associated with selected resource.

28. A method as recited in claim 25, wherein taking action in response to the signal comprises opening a folder.

29. A method as recited in claim 25, wherein taking action in response to the signal comprises opening a lower-level page.

30. A method as recited in claim 25, wherein taking action in response to the signal comprises creating a document.

31. A method as recited in claim 25, wherein taking action in response to the signal comprises using a resource as a target.

32. A method as recited in claim 25, wherein taking action in response to the signal comprises associated metadata with a resource.

33. A method as recited in claim 25, wherein taking action in response to the signal comprises displaying settings of an external device.

34. A method as recited in claim 1, wherein the shell interface is programmed according to an HTML format.

35. A method as recited in claim 1, the method further comprising:
receiving user selection of a start button on a desktop of the computing system, and
wherein displaying the user interface is performed in response to receiving the user selection of the start button.

36. A method as recited in claim 1, wherein displaying the user interface is performed automatically upon start-up of the computing system.

37. A computer readable medium having computer executable-instructions that when implemented by a computing system, causing the computing system to perform the method recited in claim 1.

38. A computer system for providing a user with selectable links to access local and remote resources in a manner that allows a user to easily find and select a desired resource without the user being aware of a source location of the resource, the computing system comprising:
a processing unit;
one or more storage media having computer-executable instructions executable by the processing unit, the computer-executable instructions including:
an operating system; and
a shell user interface within the operating system, the shell user interface within the operating system being configured to be displayed automatically, upon initial start-up of the operating system, wherein the shell user interface comprises a start page that includes:
a customized heading region identifying the start page, the customized heading region further including a link for customizing the start page;

a hierarchical links region having a plurality of hierarchical categories therein, wherein the plurality of hierarchical categories includes an activity center category, and wherein, each of the hierarchical categories is visible upon initial display of the shell user interface, and each of the hierarchical categories comprising:
- a top-level category heading identifying a logical relationship between a plurality of resources, the top-level category heading having a link thereon which, upon selection, removes the start page and replaces it with a second-level category page identifying a plurality of resources which have the logical relationship associated with the top-level category heading, wherein each second-level category page has a page heading region identifying the top-level category heading selected from the start page; and
- displaying in association with a corresponding top-level category heading, a lower-level list of a plurality resources having the logical relationship identified by the corresponding top-level category heading, wherein the logical relationship of the plurality of resources in the list and on the category page is unrelated to a source location of the resources, and wherein each item in the list comprises a link to a corresponding one of the plurality of resources, and wherein the list of resources associated with the activity center category links to a plurality of activity center category pages, each of the plurality of activity center category pages having a particular theme and identifying local and remote resources related by the particular theme;
- wherein each top-level category heading and the lower-level list of a plurality of resources for each top-level category heading is visible upon the initial display of the shell interface;

a storage device storing the plurality of local resources;

an association database storing relationships between the local and remove resources; and a display device configured to render and display the user interface to a user.

39. A computing system as recited in claim 37, the system further comprising a favorites folder stored in at least one of the storage device and the association database, the favorites folder having subfolders therein corresponding to hierarchical categories on the start page.

* * * * *